(12) United States Patent
Makino et al.

(10) Patent No.: US 8,063,547 B2
(45) Date of Patent: *Nov. 22, 2011

(54) ROTATING ELECTRIC MACHINE AND MANUFACTURING METHOD THEREOF

(75) Inventors: Shogo Makino, Fukuoka (JP); Tuyoshi Nonaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 124 days.

This patent is subject to a terminal disclaimer.

(21) Appl. No.: 12/491,098

(22) Filed: Jun. 24, 2009

(65) Prior Publication Data

US 2010/0019588 A1 Jan. 28, 2010

(30) Foreign Application Priority Data

Jul. 28, 2008 (JP) ................................. 2008-193822
Dec. 19, 2008 (JP) ................................. 2008-323458

(51) Int. Cl.
*H02K 9/00* (2006.01)

(52) U.S. Cl. .................................. 310/400; 310/216.115

(58) Field of Classification Search ................... 310/45, 310/89, 270, 400, 405, 410, 412, 216.114, 310/216.115, 407

See application file for complete search history.

(56) References Cited

U.S. PATENT DOCUMENTS 4,451,749 A * 5/1984 Kanayama et al. ............. 310/62
5,066,880 A * 11/1991 Banon ...................... 310/156.55
5,334,898 A * 8/1994 Skybyk ........................ 310/268
2009/0322180 A1* 12/2009 Nonaka ........................ 310/215

FOREIGN PATENT DOCUMENTS

| CN | 2238516 | | 10/1996 |
|---|---|---|---|
| JP | 07-107690 | | 4/1995 |
| JP | 2001309595 A | * | 11/2001 |
| JP | 2002-191149 | | 7/2002 |
| JP | 2002-191155 | | 7/2002 |
| JP | 2002369449 A | * | 12/2002 |
| JP | 2004015957 A | * | 1/2004 |
| JP | 2006-050853 | | 2/2006 |
| JP | 2007-020372 | | 1/2007 |
| JP | 2007-135326 | | 5/2007 |

OTHER PUBLICATIONS

Chinese Office Action for corresponding CN Application No. 200910152076.5, Mar. 22, 2011.

* cited by examiner

*Primary Examiner* — Tran Nguyen

(74) *Attorney, Agent, or Firm* — Ditthavong Mori & Steiner, P.C.

(57) ABSTRACT

In the rotating electric machine of the present invention, a groove, in which a load side coil end is inserted, is formed on a load side bracket; a ceramic coat is formed on the inner surface of the groove; and one or more surfaces including at least the end surface of the load side coil end among the inner circumferential surface, outer circumferential surface, and end surface of the load side coil end adhere closely to the inner surface of the groove, in which the coat is formed.

19 Claims, 29 Drawing Sheets

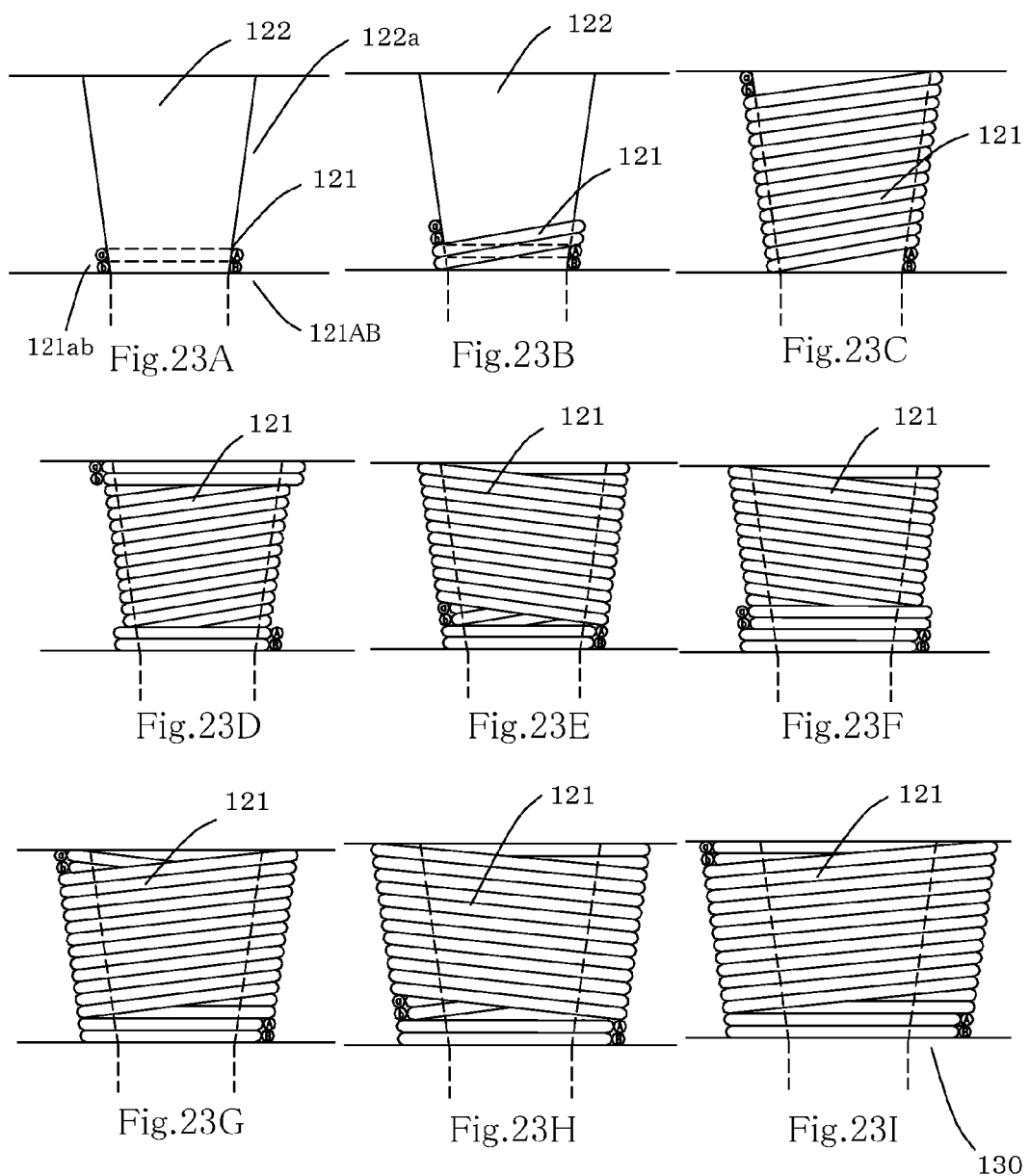

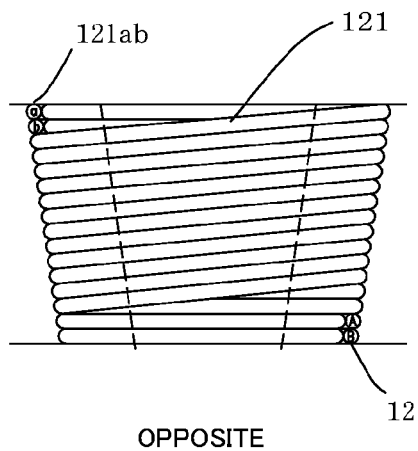
OPPOSITE LOAD SIDE
Fig.25A
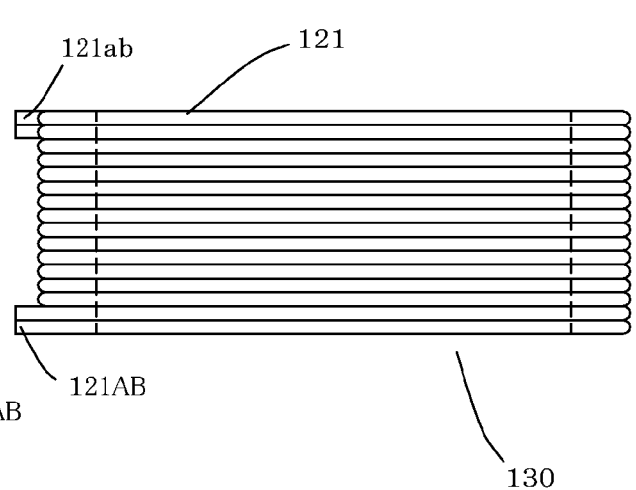
Fig.25B
Fig.26
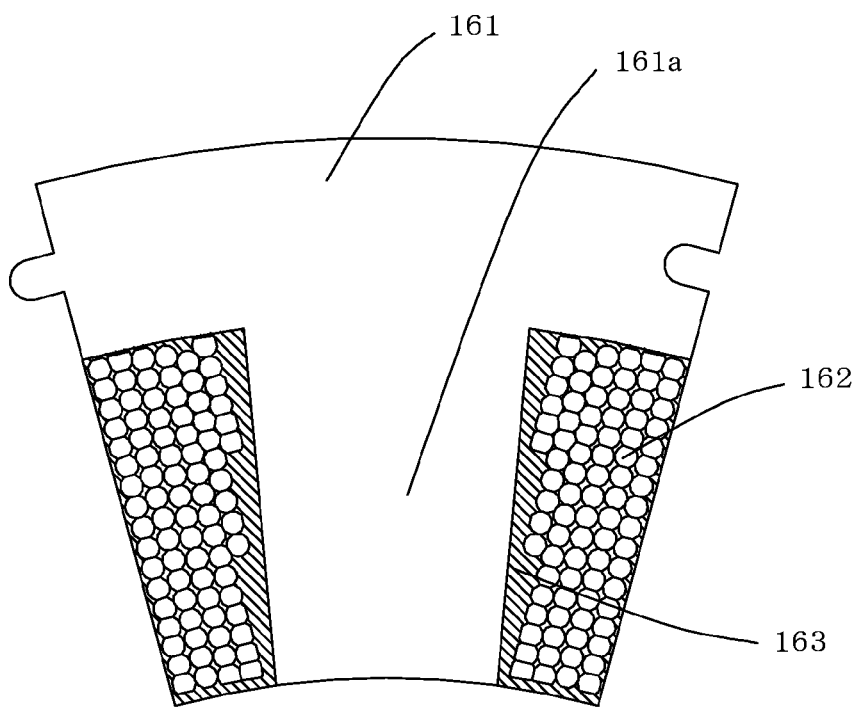

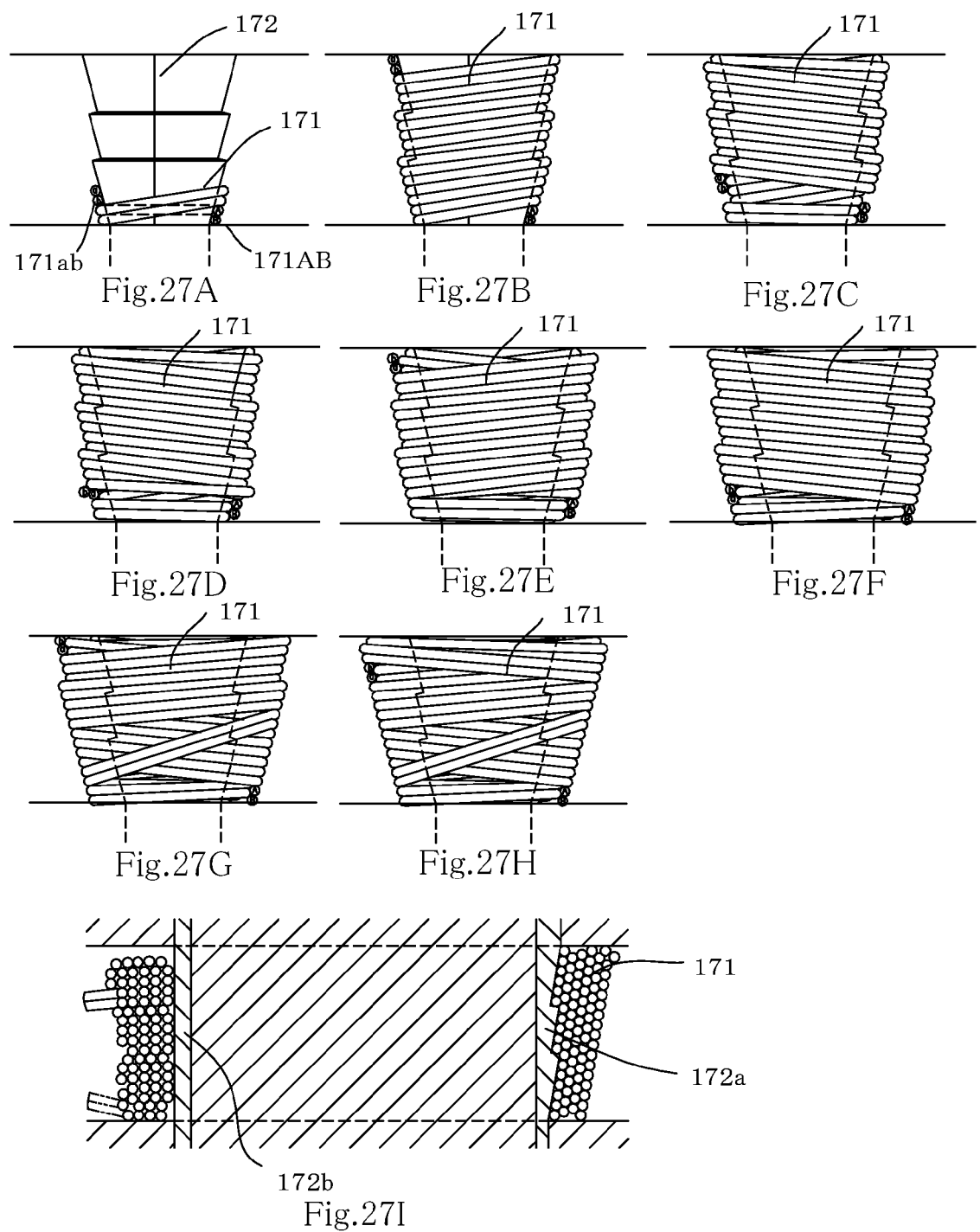

ROTATING ELECTRIC MACHINE AND MANUFACTURING METHOD THEREOF

The present application contains subject matter related to that disclosed in Japanese Priority Patent Application JP 2008-193822 filed in the Japan Patent Office on Jul. 28, 2008, and Japanese Priority Patent Application JP 2008-323458 filed in the Japan Patent Office on Dec. 19, 2008, the entire contents of which is hereby incorporated by reference.

BACKGROUND OF THE INVENTION

1. Field of the Invention

The present invention relates to a rotating electric machine, such as an AC servomotor, and a manufacturing method thereof.

2. Description of the Related Art

In a rotating electric machine, the temperature of a stator coil rises owing to heat loss caused by the driving of the rotating electric machine, and thereby the temperature of the rotating electric machine rises. In particular, in an AC servomotor and the like, a rotation detector, such as an encoder, provided on the opposite load side of the AC servomotor is weak against heat, and consequently it is required to suppress the temperature rising of the rotating electric machine as much as possible.

Accordingly, as a first conventional rotating electric machine, a technique for suppressing the temperature rise of a rotating electric machine by dissipating the heat generated in the stator coil thereof through the frame thereof has been proposed (see, for example, Japanese Patent Application Laid-Open Publication No. 2002-191155).

In the first conventional rotating electric machine, a ceramic, which is a ring-like heat conductor, is inserted between a coil end of a stator coil, wound around a stator core, and a frame. The heat conductor is firmly fixed between the coil end and the frame with a thermosetting resin.

By such a configuration, the heat generated in the stator coil can be transferred from the coil end to the frame through the heat conductor. Thereby, the cooling effect of the rotating electric machine is improved, and the temperature rise thereof can be suppressed. Moreover, more electrification can be performed to the allowable temperature of the stator coil, and consequently the rated output of the rotating electric machine can be improved.

Moreover, as a second conventional rotating electric machine, a technique for suppressing the temperature rise of a rotating electric machine by dissipating the heat generated in the stator coil thereof through the load side bracket thereof effectively has been proposed (see Japanese Patent Application Laid-Open Publication No. 2006-50853).

In the second conventional rotating electric machine, a stator coil composed of a plate-like conductor, which has been produced by stamping out a copper plate having an insulating coat thereon with a press, is mounted on the stator core of the rotating electric machine. The inner circumferential surface and outer circumferential surface of the load side coil end of the stator coil are each formed on a cylindrical surface, and their end surfaces are each formed on a flat surface. Then, the load side coil end is configured to adhere closely to a groove on the load side bracket.

By such a configuration, the heat generated in the stator coil can be transferred from the load side coil end to the load side bracket. Thereby, the cooling effect of the rotating electric machine is improved, and the temperature rise thereof can be suppressed. Moreover, more electrification can be performed to the allowable temperature of the stator coil, and consequently the rated output of the rotating electric machine can be improved.

SUMMARY OF THE INVENTION

A rotating electric machine according to a first aspect of the invention includes: a tubular frame; a stator including a stator core fitted to an inner circumferential surface of the frame to be firmly fixed thereon, and a stator coil mounted on the stator core so that a load side coil end and an opposite load side coil end may project from a load side end surface and an opposite load side end surface of the stator core, respectively; a load side bracket attached to the load side end surface of the frame, the load side bracket having a groove formed on the bracket for inserting the load side coil end therein, the groove having a ceramic coat formed on an inner surface of the groove, wherein one or more surfaces including at least an end surface among an inner circumferential surface, an outer circumferential surface, and the end surface of the load side coil end adhere closely to the inner surface of the groove, where the coat is formed; an opposite load side bracket attached to the opposite load side end surface of the frame; a rotating shaft rotatably supported by the load side bracket and the opposite load side bracket through a load side bearing and an opposite load side bearing, respectively; and a rotor attached to an outer circumferential surface of the rotating shaft.

A rotating electric machine according to a second aspect of the present invention includes: a tubular frame; a stator including a stator core fitted to an inner circumferential surface of the frame to be firmly fixed thereon, and a stator coil mounted on the stator core so that a load side coil end and an opposite load side coil end may project from a load side end surface and an opposite load side end surface of the stator core, respectively; a ceramic load side bracket attached to the load side end surface of the frame, the load side bracket having a groove formed on the bracket for inserting the load side coil end therein, wherein one or more surfaces including at least an end surface among an inner circumferential surface, an outer circumferential surface, and the end surface of the load side coil end adhere closely to the inner surface of the groove; an opposite load side bracket attached to the opposite load side end surface of the frame; a rotating shaft rotatably supported by the load side bracket and the opposite load side bracket through a load side bearing and an opposite load side bearing, respectively; and a rotor attached to an outer circumferential surface of the rotating shaft.

In the second aspect, one or more surfaces including at least the end surface among the inner circumferential surface, the outer circumferential surface, and the end surface of the load side coil end may be formed in accordance with a shape of the groove.

A manufacturing method of a rotating electric machine according to a third aspect of the present invention is a manufacturing method of a rotating electric machine including: a tubular frame; a stator including a stator core fitted to an inner circumferential surface of the frame to be firmly fixed thereon, and a stator coil mounted on the stator core so that a load side coil end and an opposite load side coil end may project from a load side end surface and an opposite load side end surface of the stator core, respectively; a load side bracket attached to the load side end surface of the frame, the load side bracket having a groove formed on the bracket for inserting the load side coil end therein; an opposite load side bracket attached to the opposite load side end surface of the frame; a rotating shaft rotatably supported by the load side bracket and the opposite load side bracket through a load side bearing and an opposite load side bearing, respectively; and a rotor attached to an outer circumferential surface of the rotating shaft, the method including the steps of: forming a ceramic coat on an inner surface of the groove of the load side bracket; and making one or more surfaces, including at least an end surface among an inner circumferential surface, an outer circumferential surface, and the end surface of the load side coil end, adhere closely to an inner surface of the groove having the coat formed therein.

In a third aspect, the step of making the surfaces adhere may be executed to unify the stator and the load side bracket with a molding resin or a varnish with the end surface of the load side coil end pushed against the groove of the load side bracket so as to adhere closely to the groove.

Alternatively, in the third aspect, the step of making the surface adhere may be executed to introduce a molding resin or a vanish into the groove of the load side bracket, insert the end surface of the load side coil end into the groove of the load side bracket, and unify the stator and the load side bracket with a molding resin or a varnish with the end surface of the load side coil end pushed against the groove of the load side bracket so as to adhere closely to the groove.

Alternatively, in the third aspect, the stator core may be formed to be a cylinder; the steps of thermally spraying the ceramic coat to a part of an inner circumferential surface of the stator core in which part the stator coil is put, and inserting the stator coil into the groove of the load side bracket may be further included; and the step of making the surfaces adhere may be executed to unify the stator and the load side bracket with a molding resin or a varnish with the end surface of the load side coil end pushed against the groove of the load side bracket so as to adhere closely to the groove.

Alternatively, in the third aspect, the step of forming one or more surfaces including at least an end surface among an inner circumferential surface, an outer circumferential surface, and the end surface of the load side coil end in accordance with a shape of the groove may be included.

A manufacturing method of an rotating electric machine according to a fourth aspect of the present invention is a manufacturing method of a rotating electric machine including: a tubular frame; a stator including a stator core fitted to an inner circumferential surface of the frame to be firmly fixed thereon, and a stator coil mounted on the stator core so that a load side coil end and an opposite load side coil end may project from a load side end surface and an opposite load side end surface of the stator core, respectively; a load side bracket made of an aluminum alloy, the load side bracket attached to the load side end surface of the frame, the load side bracket having a groove formed on the bracket for inserting the load side coil end therein; an opposite load side bracket attached to the opposite load side end surface of the frame; a rotating shaft rotatably supported by the load side bracket and the opposite load side bracket through a load side bearing and an opposite load side bearing, respectively; and a rotor attached to an outer circumferential surface of the rotating shaft, the method including the steps of: forming a ceramic coat on an inner surface of the groove of the load side bracket by thermal spraying; and making one or more surfaces, including at least an end surface among an inner circumferential surface, an outer circumferential surface, and the end surface of the load side coil end, adhere closely to an inner surface of the groove.

In the fourth aspect, the step of forming the one or more surfaces including at least the end surface among the inner circumferential surface, the outer circumferential surface, and the end surface of the load side coil end in accordance with a shape of the groove.

A rotating electric machine according to a fifth aspect of the present invention includes: a cylindrical rotor; a stator including a stator core, provided on a side of an outer periphery of the rotor, the stator core having a teeth portion, and a stator coil mounted on the teeth portion, the stator coil composed of an air-core coil having one-side end and another-side end of winding wire formed on an outer side of the air-core coil, the outer side being almost flat; and a load side bracket provided on a load side of the stator, the load side bracket having a groove formed on the bracket for inserting a load side coil end therein, wherein at least two or more surfaces among an inner circumferential surface, an outer circumferential surface, and an end surface of the load side coil end adhere closely to the groove.

In the fifth aspect, a step of a layer of the winding wire may be formed only in an inner part of the air-core coil.

A manufacturing method of a rotating electric machine according to a sixth aspect of the present invention is a manufacturing method of a rotating electric machine including: a cylindrical rotor; a stator including a stator core provided on a side of an outer periphery of the rotor, the stator core having a teeth portion, and a stator coil mounted on the teeth portion, the stator coil composed of an air-core coil having one-side end and another-side end of winding wire formed on an outer side of the air-core coil, the outer side being almost flat; and a load side bracket provided on a load side of the stator, the load side bracket having a groove formed on the bracket for inserting a load side coil end therein, wherein at least two or more surfaces among an inner circumferential surface, an outer circumferential surface, and an end surface of the load side coil end adhere closely to the groove, the method including the steps of: forming the air-core coil by winding the winding wire around a winding jig including a winding portion, on which a step is formed to divide the winding portion into a plurality of parts; and removing the plurality of parts from the air-core coil by moving the plurality of parts to an inner part of the winding jig.

In the sixth aspect, the winding wire may be a round copper wire having an insulating coat, and the step of forming an external shape of the air-core coil by pressurizing the air-core coil from which the winding jig has been removed with a mold.

Alternatively, in the sixth aspect, the winding wire may be a rectangular copper wire having an insulating coat and a rectangular cross section, or a square copper wire having an insulating coat and a square cross section.

BRIEF DESCRIPTION OF THE DRAWINGS

The present invention will be described in further detail with reference to the accompanying drawings wherein:

FIGS. 23A, 23B, 23C, 23D, 23E, 23F, 23G, 23H, and 23I are views for illustrating a winding method of an air-core coil in the fifth embodiment;

FIGS. 25A and 25B are views showing the air-core coil in the fifth embodiment in the state in which the winding of the air-core coil has been completed when the air-core coil is viewed from two directions;

FIG. 26 is a sectional front view of a part of the stator of a rotating electric machine according to a sixth embodiment;

FIGS. 27A, 27B, 27C, 27D, 27E, 27F, 27G, 27H, 27I are views for illustrating a winding method of an air-core coil in the sixth embodiment;

DETAILED DESCRIPTION OF THE PREFERRED EMBODIMENTS

First Embodiment

Figure 1:
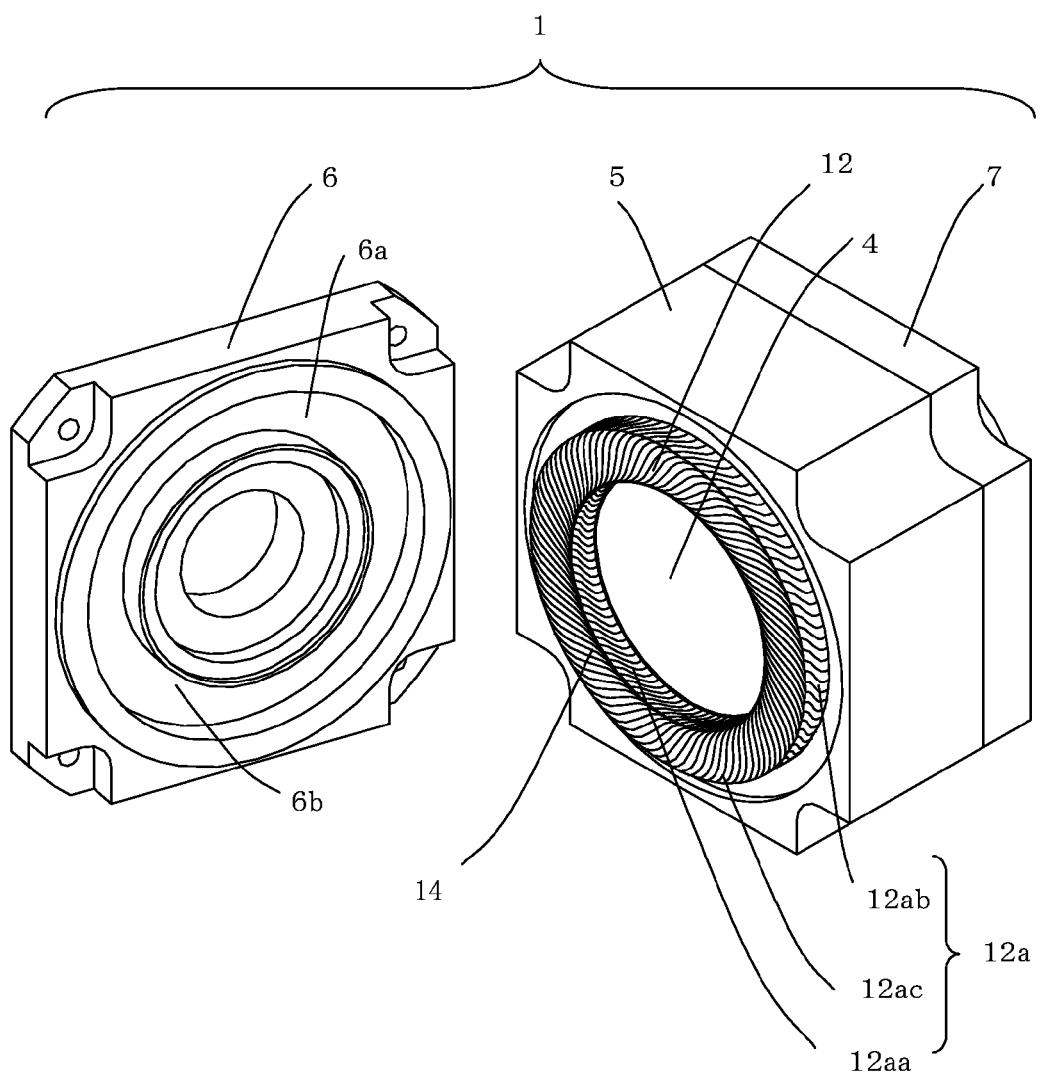
FIG. 1 is a perspective view showing a decomposed state of a rotating electric machine according to a first embodiment.
Figure 2:
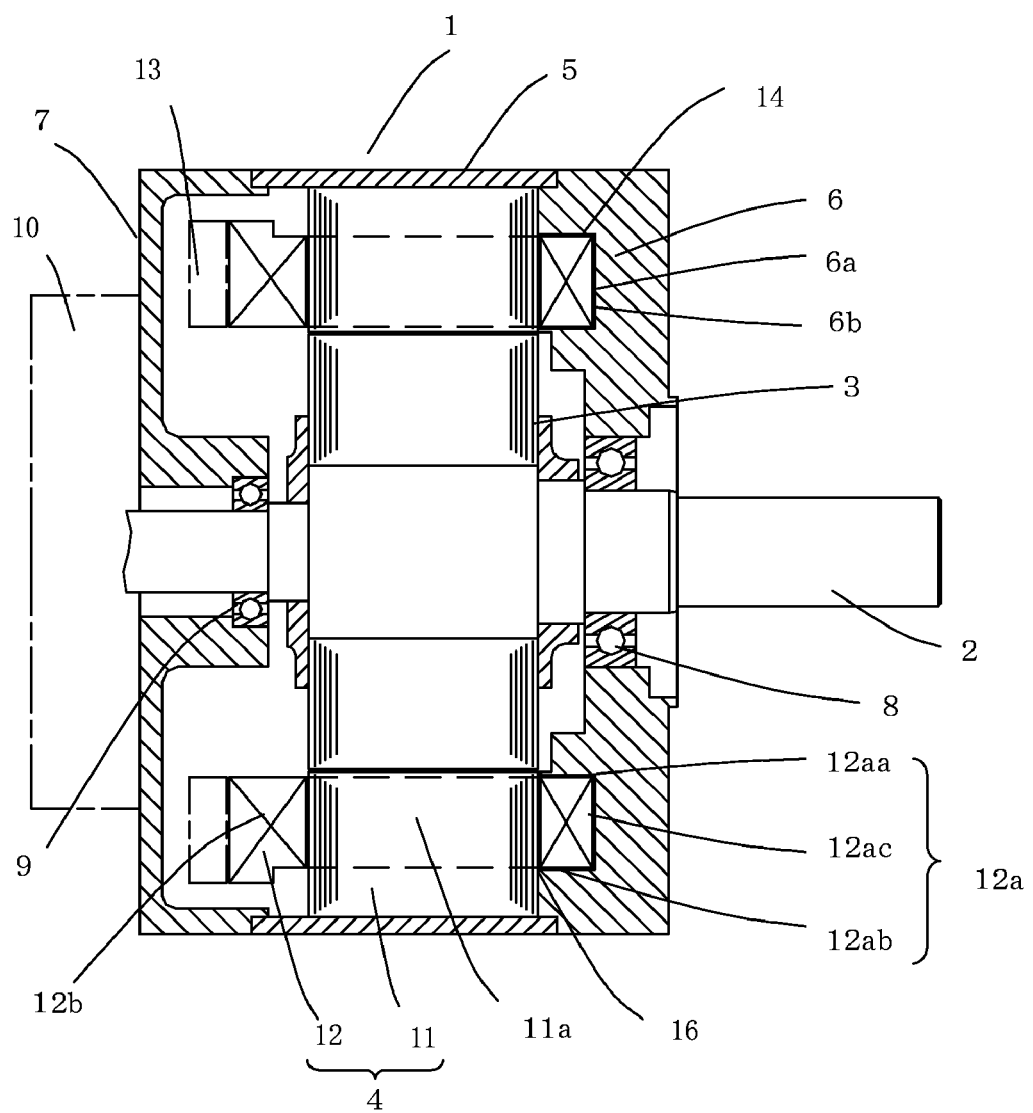
FIG. 2 is a sectional side view of the rotating electric machine according to the first embodiment.
Figure 3:
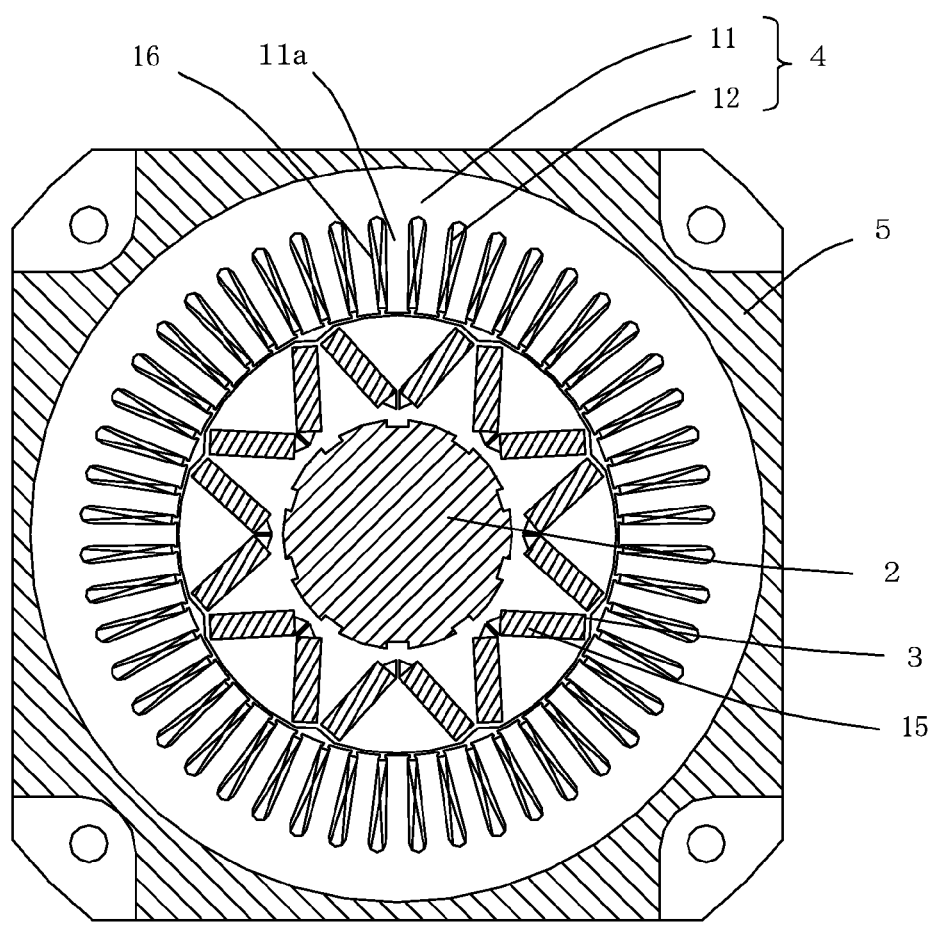
FIG. 3 is a sectional front view of the rotating electric machine according to the first embodiment.

FIG. 1 is a perspective view showing a decomposed state of a rotating electric machine according to a first embodiment of the present invention. FIG. 2 is a sectional side view of the rotating electric machine according to the first embodiment. FIG. 3 is a sectional front view of the rotating electric machine according to the first embodiment.

In FIGS. 1-3, the rotating electric machine 1 is an embedded magnet type synchronous motor, and is mainly equipped with a rotating shaft 2, a rotor 3, a stator 4, a frame 5, a load side bracket 6, an opposite load side bracket 7, a load side bearing 8, an opposite load side bearing 9, and an encoder unit 10.

As shown in FIG. 2, the stator 4 mainly includes a stator core 11 and a stator coil 12. The stator 4 is held on the inner circumference of the tubular frame 5. The frame 5 is fastened to the load side bracket 6 installed on the load side together with the opposite load side bracket 7 with not shown bolts.

Insulating paper 16 is mounted on a teeth portion 11a of the stator core 11, and an insulating treatment is performed to the teeth portion 11a. After winding a winding wire having an insulating coat by distributed winding, the wound winding wire is mounted on the teeth portion 11a, which has been subjected to the insulating treatment, and thereby the stator coil 12 is formed. The load side coil end 12a of the stator coil 12 includes an inner circumferential surface 12aa and an outer circumferential surface 12ab, each formed on a cylindrical surface, and an end surface 12ac formed on a flat surface. The opposite load side coil end 12b of the stator coil 12 is connected to a wire connection portion 13 in a neighborhood.

The load side bracket 6 includes a concave-shaped ring-like groove 6a adhering closely to the inner circumferential surface 12aa, outer circumferential surface 12ab, and end surface 12ac of the load side coil end 12a. A ceramic coat 6b having high heat conductance is formed in the groove 6a.

The stator 4 and the load side bracket 6 are unified with a molding resin 14 in the state in which the end surface 12ac of the load side coil end 12a is pushed against the groove 6a having the formed ceramic coat 6b having the high heat conductance so as to adhere closely to the groove 6a.

As shown in FIGS. 2 and 3, the rotor 3 is shaped in a cylindrical form. The rotor 3 is an embedded magnet type rotor, and is provided onto the outer circumferential surface of the rotating shaft 2. Permanent magnets 15 are laid in the inner part of the rotor 3. The rotor 3 is rotatably held by the load side bracket 6 and opposite load side bracket 7 with the load side bearing 8 and the opposite load side bearing 9, respectively, which are installed on the rotating shaft 2. The encoder unit 10 for detecting rotation positions is installed on the opposite load side of the rotating shaft 2.

Figure 4:
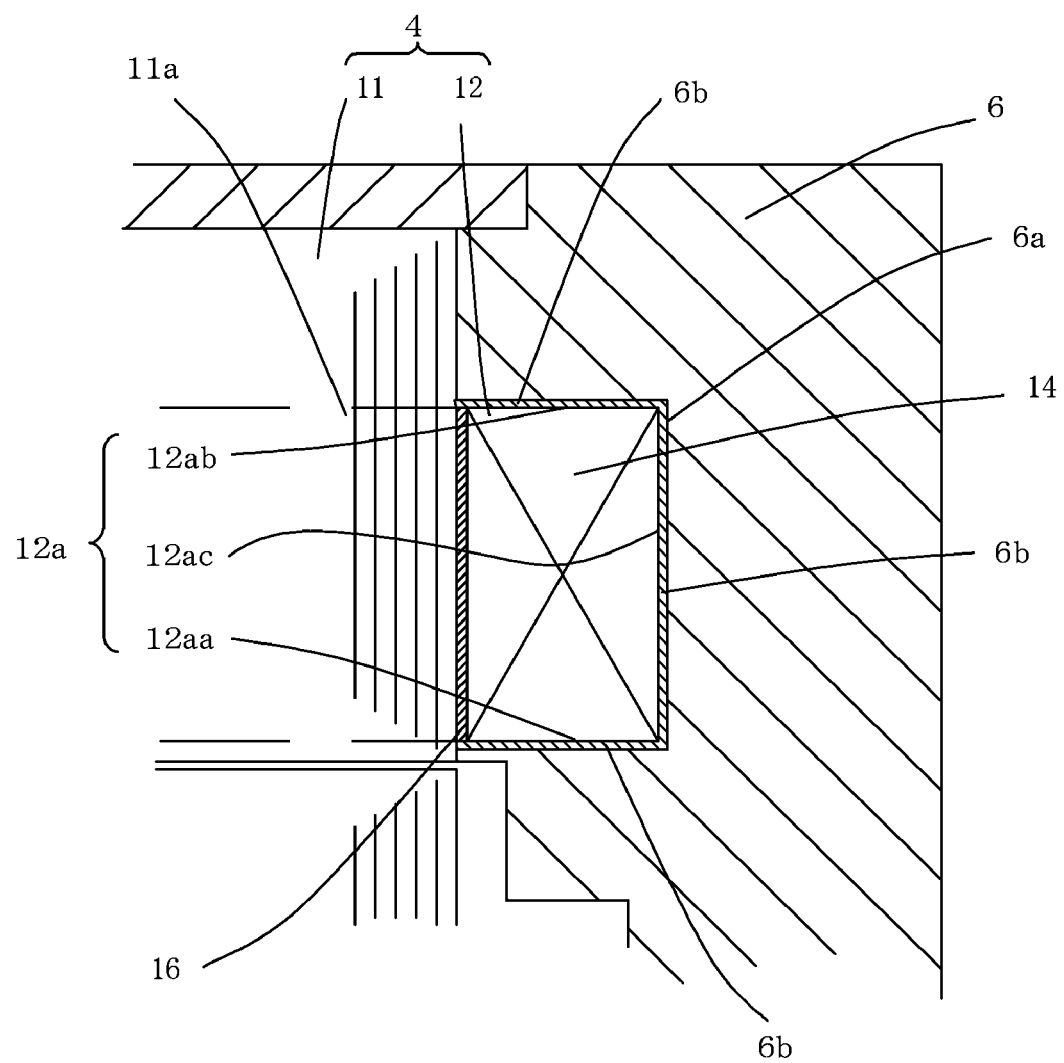
FIG. 4 is an enlarged sectional view of the neighborhood of a load side coil end in the first embodiment.

FIG. 4 is an enlarged sectional view in the neighborhood of the load side coil end 12a.

In FIG. 4, the coat 6b is formed on the whole groove 6a. Thereby, the insulation performance between the load side coil end 12a and the load side bracket 6 is secured. The thickness of the coat 6b is made to be the minimum thickness for being capable of securing the insulation performance. The thickness is set to be within a range of from 0.3 mm to 0.5 mm here.

The rotating electric machine 1 can be miniaturized while securing the insulation performance between the load side coil end 12a and the load side bracket 6 by the thickness of the coat 6b formed in the groove 6a.

Moreover, the end surface 12ac of the load side coil end 12a is left to be pushed against the groove 6a, in which the ceramic coat 6b having the high heat conductance is formed, so as to be made to adhere closely to the groove 6a, and then the stator 4 and the load side bracket 6 are unified with the molding resin 14. Consequently, the heat generated in the stator coil 12 can be effectively dissipated, and the cooling effect thereof can be improved. Moreover, more electrification can be performed against the allowable temperature of the stator coil 12, and the rated output thereof can be exceptionally improved.

Figure 5:
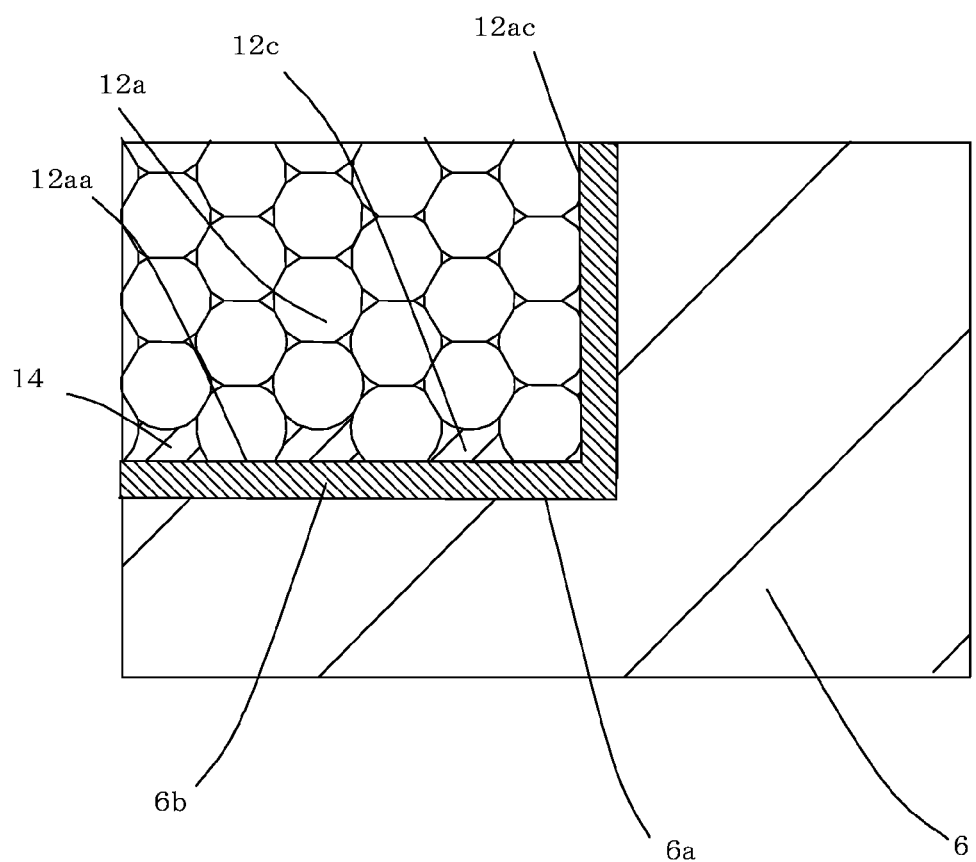
FIG. 5 is an enlarged sectional view of a part where a stator coil and a load side bracket adhere closely to each other in the first embodiment.

FIG. 5 is an enlarged sectional view of the part where the stator coil 12 and the load side bracket 6 adheres closely to each other.

In FIG. 5, the load side coil end 12a is pressurized to be formed so that the external shape of the load side coil end 12a may be the shape according to that of the groove 6a. Consequently, the external shape of the load side coil end 12a becomes a flat surface shape having few concavities and convexities. However, since the stator coil 12 is composed of the winding wire, some concavities and convexities are produced on the surface of the load side coil end 12a. Consequently, convexoconcave spaces 12c owing to the winding wire are formed between the load side coil end 12a and the coat 6b. Owing to the spaces 12c, creeping discharges are generated between the winding wire of the stator coil 12 along the groove 6a, and consequently there is the possibility of the occurrence of short circuits between the winding wire of the stator coil 12. However, since the stator 4 and the load side bracket 6 are unified with the molding resin 14, the molding resin 14 is filled up in the spaces 12c. Consequently, the possibility that the creeping discharges are generated between the winding wire of the stator coil 12 and the winding wire of the stator coil 12 is short-circuited becomes smaller, and then the insulation performances between the winding wire of the stator coil 12 can be secured.

Incidentally, although a round wire is used as the coil in the first embodiment, even if a flat wire is used, some concavities and convexities are produced owing to the roundness of the edges of the flat wire. Moreover, if the rotating electric machine 1 is a low voltage rotating electric machine, then there are no problems if the spaces 12c remain when the insulation property between the winding wire of the stator coil 12 is secured only by the insulating coat of the stator coil 12 and the stator 4 and the load side bracket 6 are unified with the molding resin 14 or a varnish.

Figure 6:
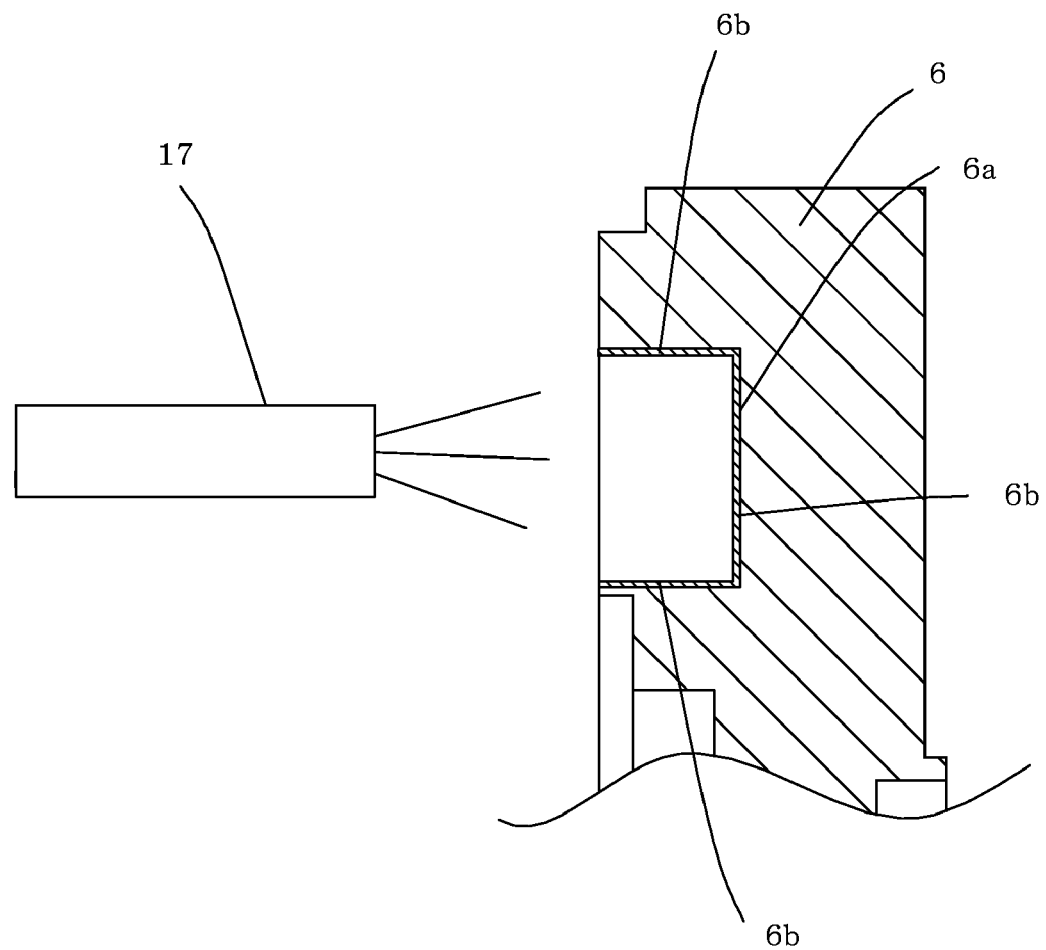
FIG. 6 is a view for illustrating a manufacturing method of the load side bracket in the first embodiment.

Next, a manufacturing method of the load side bracket 6 will be described. FIG. 6 is a view for illustrating the manufacturing method of the load side bracket 6.

In FIG. 6, the load side bracket 6 is made of an aluminum alloy. The load side bracket 6 includes the groove 6a adhering closely to the load side coil end 12a on the inner circumferential surface 12aa, outer circumferential surface 12ab, and end surface 12ac of the load side coil end 12a. The ceramic coat 6b is formed on the whole groove 6a by thermal spraying with a thermal spraying nozzle 17.

The kind of the ceramics is desirably alumina or aluminum nitride. The ceramic coat 6b has a high insulation performance and high heat conductance. Moreover, the ceramic coat 6b is formed by the thermal spraying. Consequently, the joining performance between the load side bracket 6 and the ceramic coat 6b can be made to be high, and the contact thermal resistance between them can be made to be small. As a result, the heat generated in the stator coil 12 can be dissipated further effectively.

Figure 7A:
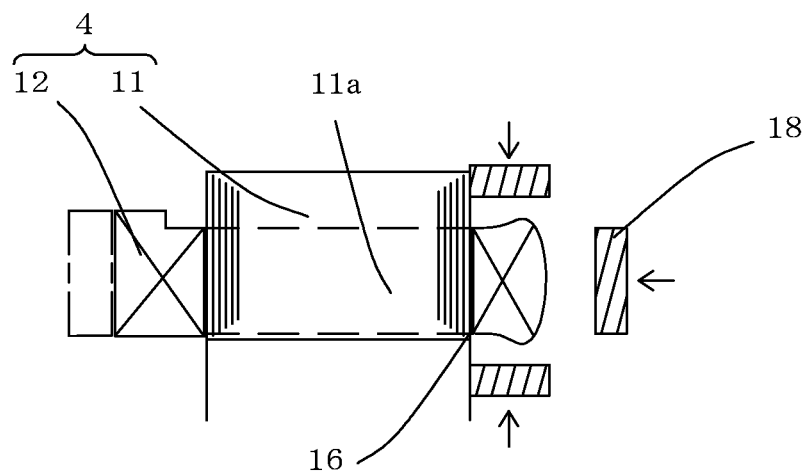
FIGS. 7A and 7B are views for illustrating a manufacturing method of a stator in the first embodiment.
Figure 7B:
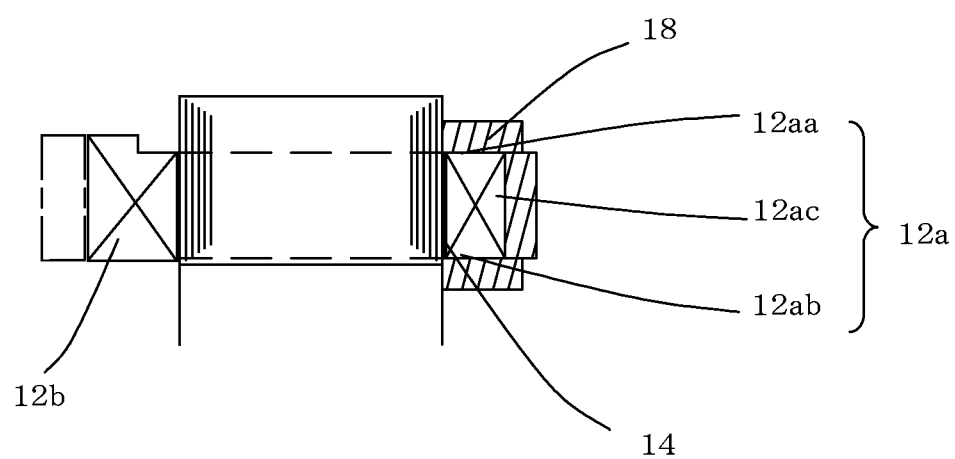
Figure 8:
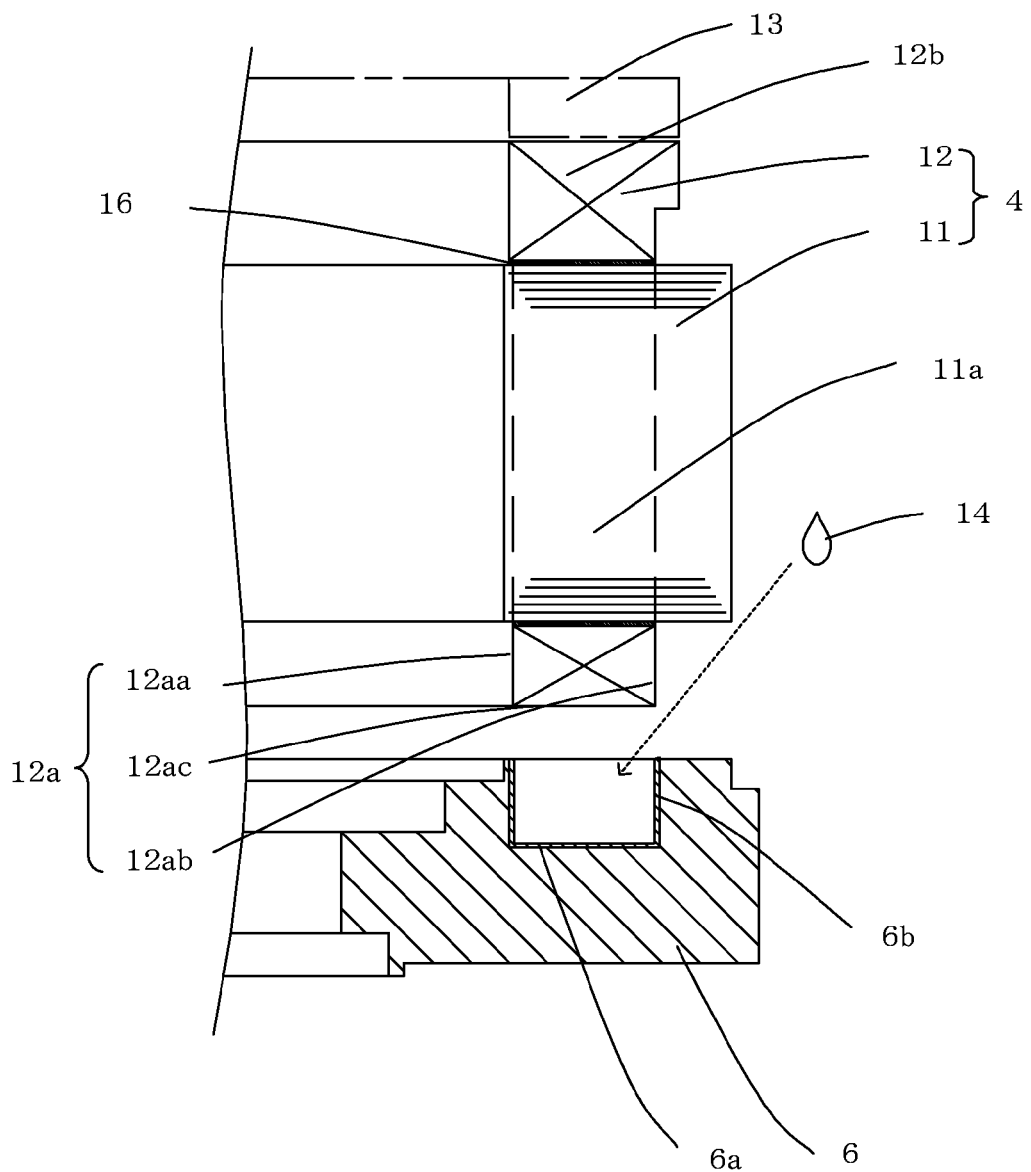
FIG. 8 is a view for illustrating the manufacturing method of the stator in the first embodiment.

Next, a manufacturing method of the stator 4 will be described. FIGS. 7A and 7B and FIG. 8 are views for illustrating the manufacturing method of the stator 4. FIG. 7A shows the stator 4 before the forming of the stator coil 12. FIG. 7B shows the stator 4 after the forming of the stator coil 12. FIG. 8 shows the state of unifying the stator 4 and the load side bracket 6.

In FIGS. 7A and 7B, first, the insulating paper 16 is mounted on the teeth portion 11a of the stator core 11, and thereby an insulating treatment of the teeth portion 11a of the stator core 11 is performed. Next, a winding wire having an insulating coat is wound by the distributed winding, and then the wound winding wire is mounted on the teeth portion 11a subjected to the insulating treatment. Thereby, the stator coil 12 is formed. Next, the load side coil end 12a of the stator coil 12 is pressurized with a forming jig 18, and then the external shape of the load side coil end 12a is formed. Thereby, each of the inner circumferential surface 12aa and outer circumferential surface 12ab of the load side coil end 12a is formed on a cylindrical surface, and the end surface 12ac is formed on a flat surface.

Since the stator coil 12 is manufactured by a round wire, which is a general winding wire, the stator coil 12 is inexpensive. Moreover, by the forming of the external shape of the load side coil end 12a, the external shape of the load side coil end 12a becomes a flat surface shape having few concavities and convexities to be a high-accuracy shape.

Incidentally, the external shape of the opposite load side coil end 12b is not formed in order to dissipate the heat generated in the stator coil 12 through the load side bracket 6.

In FIG. 8, first, the molding resin 14 is put into the groove 6a, in which the coat 6b is formed. Next, the end surface 12ac of the load side coil end 12a is inserted into the groove 6a having the formed coat 6b. Next, the stator 4 and the load side bracket 6 are unified with further molding resin 14 with the end surface 12ac of the load side coil end 12a left to be pushed against the groove 6a having the formed coat 6b so that the end surface 12ac may adhere closely to the groove 6a.

The length of the projection of the load side coil end 12a from the stator core 11 is set to be the same as the length of the groove 6a in the axial direction thereof, or to be longer than the length of the groove 6a in the axial direction thereof. Thereby, when the end surface 12ac of the load side coil end 12a is pushed against the groove 6a, the end surface 12ac of the load side coil end 12a can be surely made to adhere closely to the groove 6a.

Furthermore, since the external shape of the load side coil end 12a is formed, each of the inner circumferential surface 12aa and outer circumferential surface 12ab of the load side coil end 12a is formed on a cylindrical surface, and the end surface 12ac is formed on a flat surface. Consequently, the inner circumferential surface 12aa and outer circumferential surface 12ab of the load side coil end 12a adhere closely to the groove 6a more surely.

Incidentally, the load side coil end 12a and the groove 6a have only to adhere closely to each other on one or more surfaces including at least the end surface 12ac among the inner circumferential surface 12aa, the outer circumferential surface 12ab, and the end surface 12ac of the load side coil end 12a.

When the stator 4 and the load side bracket 6 are unified with the molding resin 14, the molding resin 14 is generally filled up in concavo-convex spaces formed by the winding wire between the load side coil end 12a and the groove 6a. However, because the concavo-convex spaces are small, it is necessary to be careful at the time of filling up the molding resin 14. Furthermore, if heat conductor powder or the like is mixed into the molding resin 14, the viscosity of the molding resin 14 becomes high. Then, when the stator 4 and the load side bracket 6 are unified with the molding resin 14, the molding resin 14 cannot be injected into the whole motor sometimes.

On the other hand, in the present first embodiment, after the molding resin 14 has been introduced into the groove 6a, the end surface 12ac of the load side coil end 12a is pushed against the groove 6a so as to adhere closely to the groove 6a. Consequently, the molding resin 14 can be surely filled up into the concavo-convex spaces. As a result, the possibility that the creeping discharges are generated between the winding wire of the stator coil 12 and the winding wire of the stator coil 12 are short-circuited becomes smaller, and the insulation between the winding wire of the stator coil 12 can be secured.

On the outer periphery of the stator 4 unified with the load side bracket 6, the frame 5 is provided. Moreover, the frame 5 is fastened to the load side bracket 6 with not shown bolts, and adheres closely to the load side bracket 6. Consequently, the heat generated in the stator coil 12 is dissipated more effectively from the load side bracket 6 through the load side coil end 12a, and at the same time the heat is dissipated more effectively from the load side bracket 6 through the stator core 11 and the frame 5.

Figure 9:
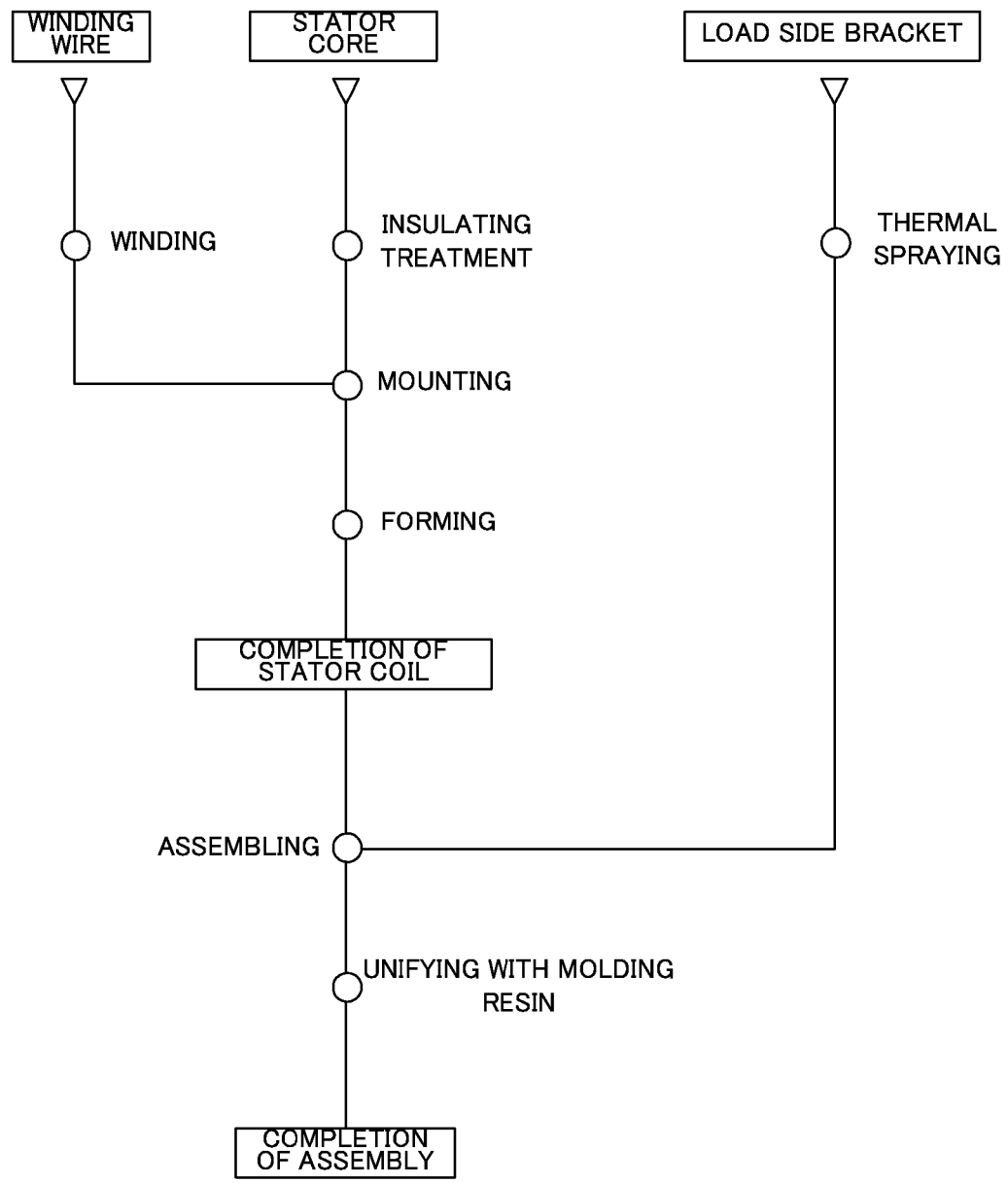
FIG. 9 is a flow chart showing a processing procedure for manufacturing the load side bracket and the stator in the first embodiment.

FIG. 9 is a flow chart showing a processing procedure of manufacturing the load side bracket 6 and the stator 4.

As shown in FIG. 9, in the load side bracket 6, the ceramic coat 6b is formed in the whole groove 6a by the thermal spraying with the thermal spraying nozzle 17. In the stator core 11, an insulating treatment of the teeth portion 11a of the stator core 11 is performed. In the stator coil 12, a winding wire having an insulating coat is wound by the distributed winding.

The stator coil 12 is mounted in the teeth portion 11a of the stator core 11 subjected to the insulating treatment. After that, the load side coil end 12a of the stator coil 12 is pressurized with the forming jig 18, and then the external shape of the load side coil end 12a is formed. Thereby, the stator coil 12 is completed.

After the introduction of the molding resin 14 into the groove 6a, the end surface 12ac of the load side coil end 12a is inserted into the groove 6a, in which the coat 6b is formed, (the stator 4 and the load side bracket 6 are assembled). After that, the stator 4 and the load side bracket 6 are unified with a further molding resin 14 with the end surface 12ac of the load side coil end 12a pushed against the groove 6a, in which the coat 6b is formed, so as to adhere closely to the groove 6a. Thereby, the assembly of the stator 4 and the load side bracket 6 is completed. Incidentally, the stator 4 and the load side bracket 6 may be unified with a varnish in place of the molding resin 14.

Second Embodiment

Figure 10:
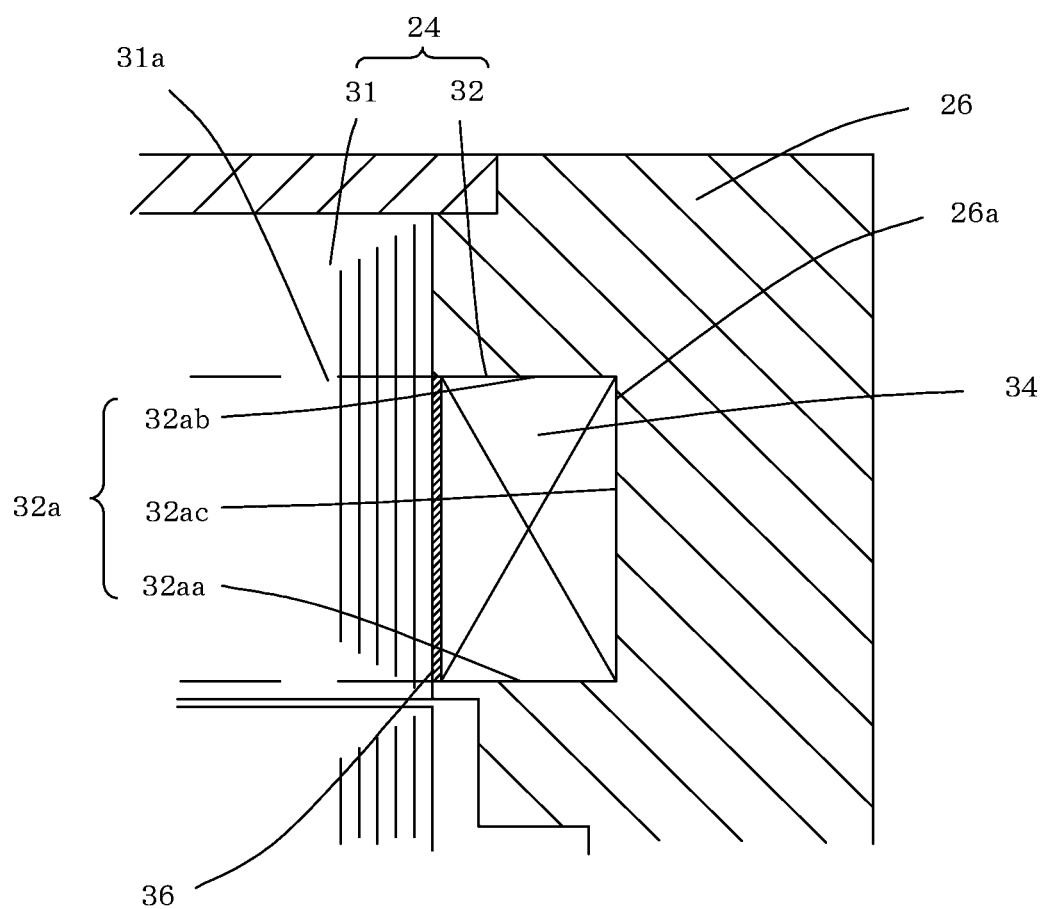
FIG. 10 is an enlarged sectional view of the neighborhood of a load side coil end of a rotating electric machine according to a second embodiment.

FIG. 10 is an enlarged sectional view of the neighborhood of a load side coil end of a rotating electric machine according to a second embodiment of the present invention.

The rotating electric machine according to the second embodiment differs from that of the first embodiment in that no ceramic coat is formed on the inner surface of the groove of a load side bracket and the load side bracket is made of ceramics. In the following, the different points will be described mainly.

In FIG. 10, a stator 24 mainly includes a stator core 31 and a stator coil 32. A sheet of insulating paper 36 is mounted on a teeth portion 31a of the stator core 31, and an insulating treatment is performed to the teeth portion 31a. Moreover, after winding a winding wire having an insulating coat by the distributed winding, the wound winding wire is mounted on the teeth portion 31a, which has been subjected to the insulating treatment, and thereby the stator coil 32 is formed. The load side coil end 32a of the stator coil 32 includes an inner circumferential surface 32aa and an outer circumferential surface 32ab, each formed on a cylindrical surface, and an end surface 32ac formed on a flat surface.

A load side bracket 26 is made of a ceramic material. The load side bracket 26 includes a concave-shaped ring-like groove 26a adhering closely to the inner circumferential surface 32aa, outer circumferential surface 32ab, and end surface 32ac of the load side coil end 32a.

The stator 24 and the load side bracket 26 are unified with a molding resin 34 in the state in which the end surface 32ac of the load side coil end 32a is pushed against the groove 26a so as to adhere closely to the groove 26a.

As described above, according to the second embodiment, the load side bracket 26 is made of a ceramic material, and having a high insulation performance and high heat conductance. Consequently, even if the ceramic coat 6b is omitted, the rotating electric machine can be miniaturized with the insulation performance between the load side coil end 32a and the groove 26a secured.

Moreover, the stator 24 and the load side bracket 26 are unified with the molding resin 34 with the end surface 32ac of the load side coil end 32a pushed against the groove 26a so as to adhere closely to the groove 26a. Thereby, the heat generated in the stator coil 32 can be transferred effectively to the load side bracket 26 touching the open air or the main body of an apparatus to which the rotating electric machine is attached. That is, the heat generated in the stator coil 32 is rapidly dissipated to the outside of the rotating electric machine, and then the cooling effect of the rotating electric machine can be improved. Moreover, more electrification can be performed to the allowable temperature of the stator coil 32, and the rated output of the rotating electric machine can be exceptionally improved.

Third Embodiment

Figure 11:
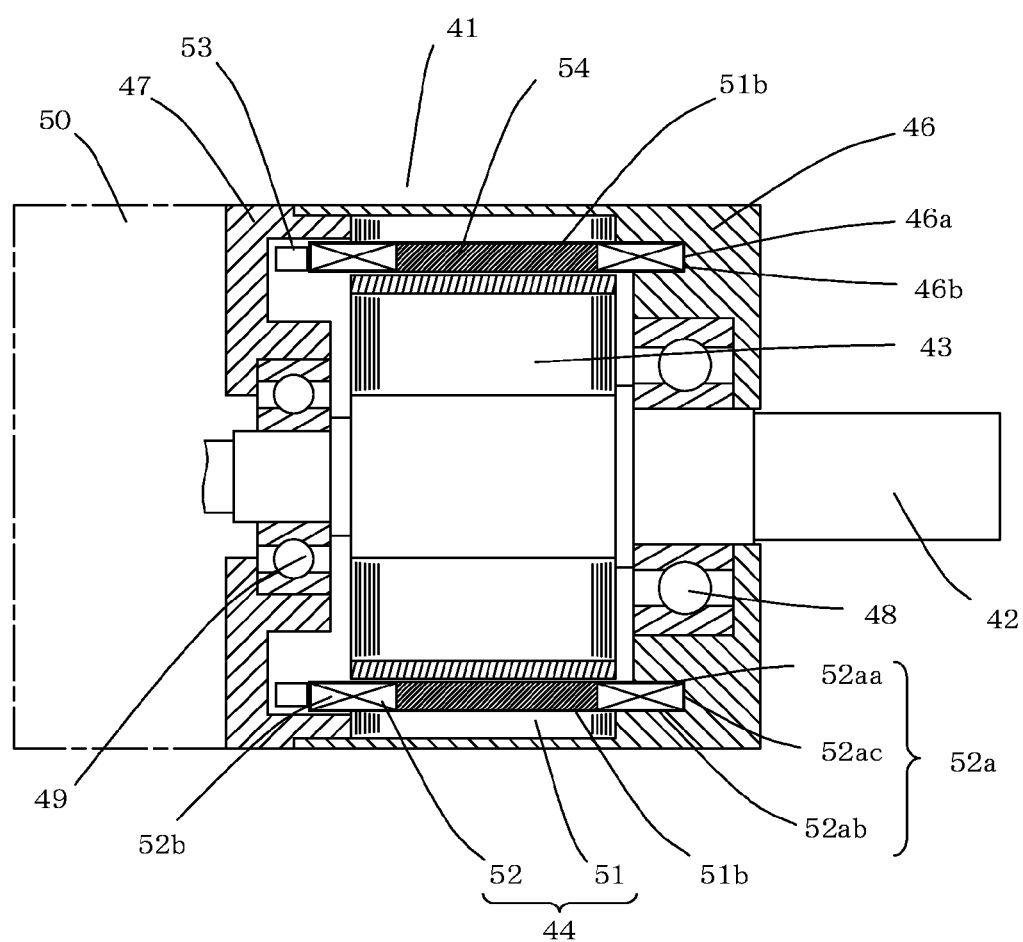
FIG. 11 is a sectional side view of a rotating electric machine according to a third embodiment.
Figure 12:
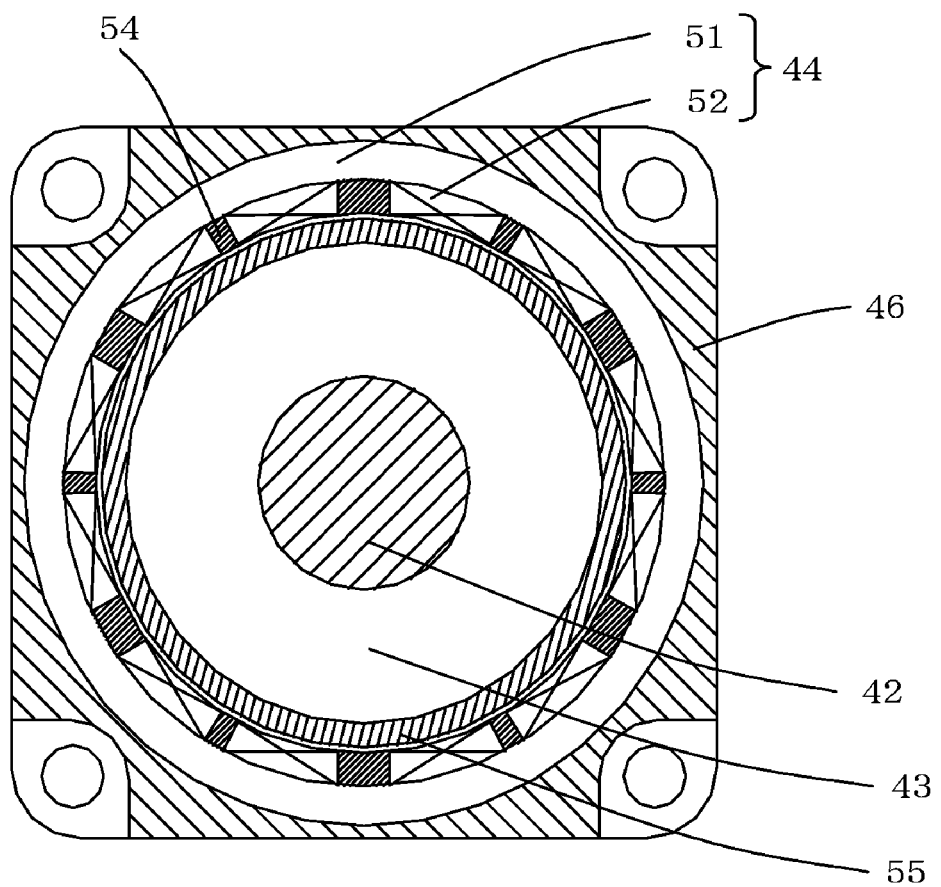
FIG. 12 is a sectional front view of the rotating electric machine according to the third embodiment.

FIG. 11 is a sectional side view of a rotating electric machine according to a third embodiment. FIG. 12 is a sectional front view of the rotating electric machine.

In FIGS. 11 and 12, a rotating electric machine 41 is a surface magnet type synchronous motor, and is mainly equipped with a rotating shaft 42, a rotor 43, a stator 44, a load side bracket 46, an opposite load side bracket 47, a load side bearing 48, an opposite load side bearing 49, and an encoder unit 50. The stator 44 mainly includes a stator core 51 and a stator coil 52. The stator 44 mainly includes a slotless cylindrical stator core 51 and a stator coil 52. The stator 44 has a frame portion, and is held on the inner circumference of the load side bracket 46 installed on the load side. The load side bracket 46 is fastened to the opposite load side bracket 47 with not shown bolts.

After winding a winding wire having an insulating coat, the external shape of the wound winding wire is formed by pressurizing the wound winding wire with a mold. After that, the adjoining wound winding wires are bonded, and thus an air-core coil is formed. The air-core coil is mounted on the inner circumference of the slotless stator core 51, and thereby the stator coil 52 is formed. The load side coil end 52a of the stator coil 52 includes an inner circumferential surface 52aa and an outer circumferential surface 52ab, each formed on a cylindrical surface, and an end surface 52ac formed on a flat surface. The opposite load side coil end 52b of the stator coil 52 is connected in a wire connection portion 53 in the neighborhood.

The load side bracket 46 includes a concave-shaped ring-like groove 46a adhering closely to the inner circumferential surface 52aa, outer circumferential surface 52ab, and end surface 52ac of the load side coil end 52a. A ceramic coat 46b having high heat conductance is formed in the groove 46a and a part 51b, where the stator core 51 touches the stator coil 52.

The stator 44 and the load side bracket 46 are unified with a molding resin 54 in the state in which the end surface 52ac of the load side coil end 52a is pushed against the groove 46a so as to adhere closely to the groove 46a.

As shown in FIGS. 11 and 12, the rotor 43 is shaped in a cylindrical form. The rotor 43 is a surface magnet type rotor, and is provided onto the outer circumferential surface of the rotating shaft 42. A permanent magnet 55 is mounted on the outer part of the rotor 43. The rotor 43 is rotatably held by the load side bracket 46 and opposite load side bracket 47 with the load side bearing 48 and the opposite load side bearing 49, respectively, which are installed on the rotating shaft 42. The encoder unit 50 for detecting rotation positions is installed on the opposite load side of the rotating shaft 42.

Figure 13:
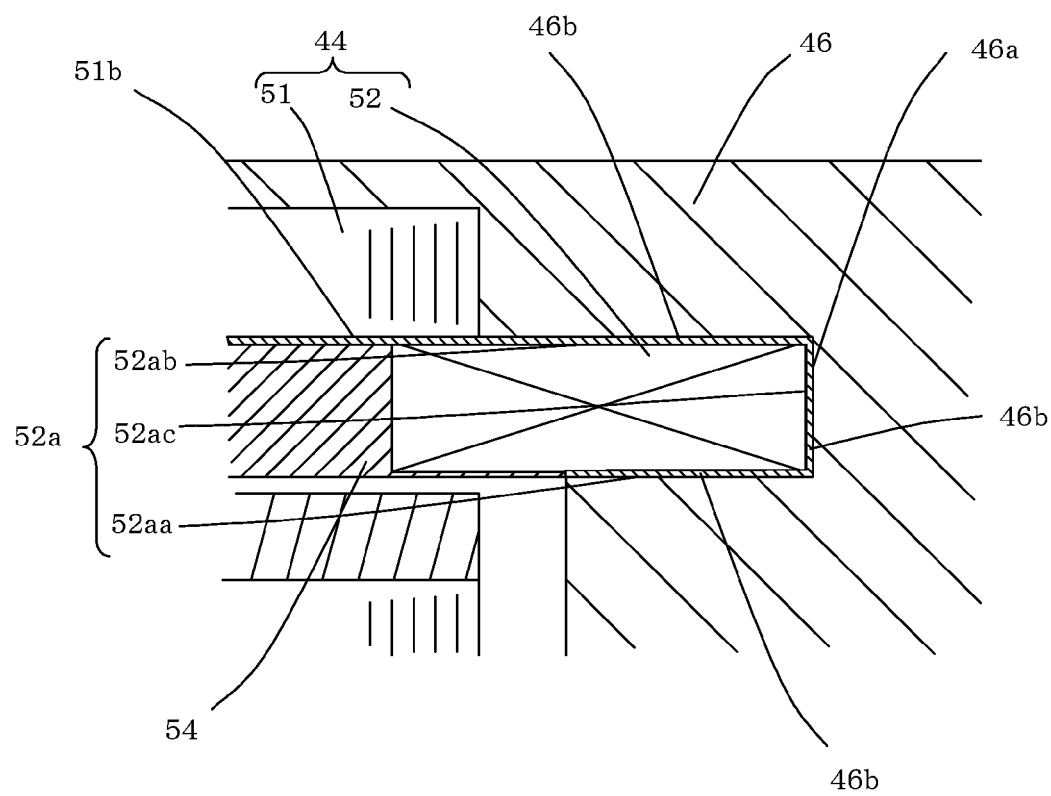
FIG. 13 is an enlarged sectional view of the neighborhood of a load side coil end in the third embodiment.

FIG. 13 is an enlarged sectional view in the neighborhood of the load side coil end 52a.

In FIG. 13, the coat 46b is formed in the whole groove 46a and the whole part 51b, where the stator core 51 touches the stator coil 52. Thereby, each of the insulation performance between the load side coil end 52a and the load side bracket 46 and the insulation performance between the load side coil end 52a and the stator core 51 is secured. The thickness of the coat 46b is made to be the minimum thickness for being capable of securing the insulation performance. The thickness is set to be within a range of from 0.3 mm to 0.5 mm here.

The rotating electric machine can be miniaturized while securing each of the insulation performance between the load side coil end 52a and the load side bracket 46 and the insulation performance between the load side coil end 52a and the stator core 51 by the thickness of the coat 46b formed in the groove 46a and the part 51b.

Moreover, the end surface 52ac of the load side coil end 52a is left to be pushed against the groove 46a, in which the coat 46b is formed, so as to be made to adhere closely to the groove 46a, and then the stator 44 and the load side bracket 46 are unified with the molding resin 54. Consequently, the heat generated in the stator coil 52 can be effectively dissipated through not only the load side bracket 46 but also the stator core 51, and the cooling effect of the stator coils 52 can be improved. Moreover, more electrification can be performed against the allowable temperature of the stator coil 52, and the rated output can be exceptionally improved.

Figure 14:
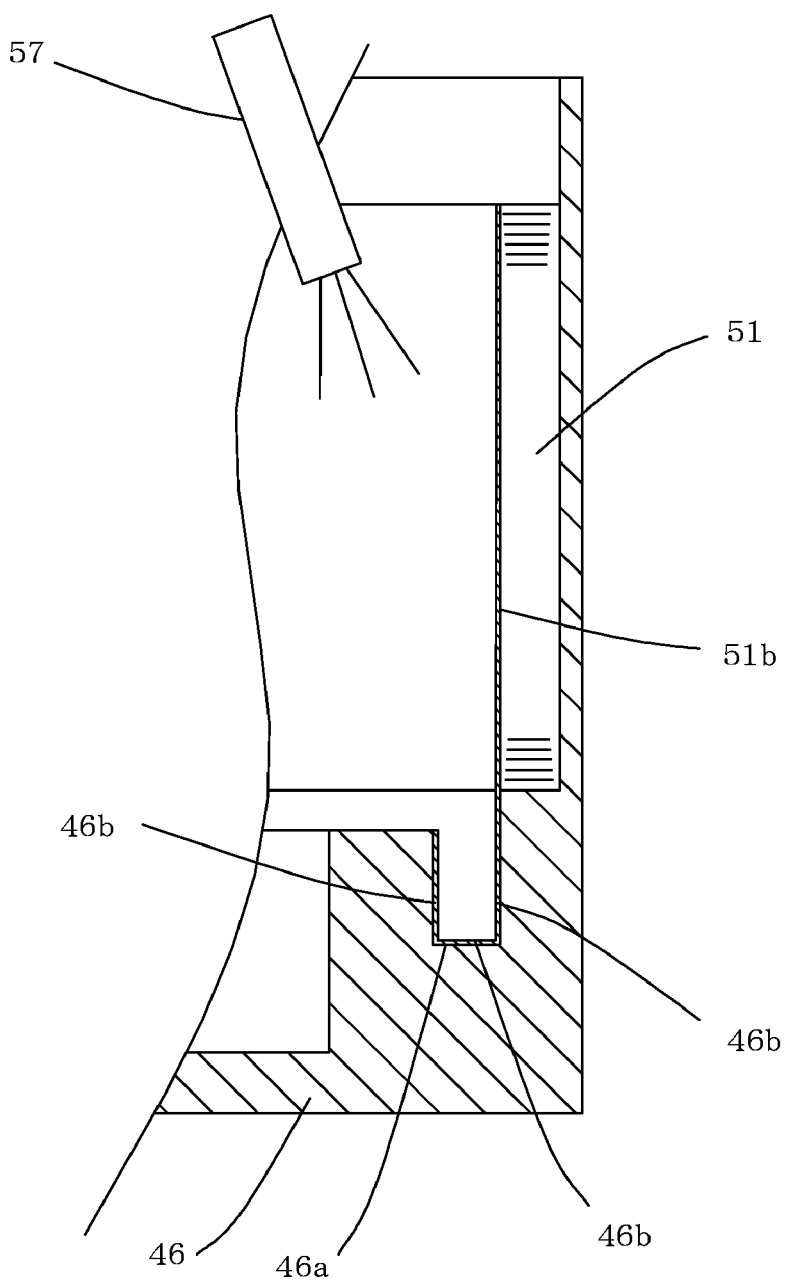
FIG. 14 is a view for illustrating a manufacturing method of a stator in the third embodiment.
Figure 15:
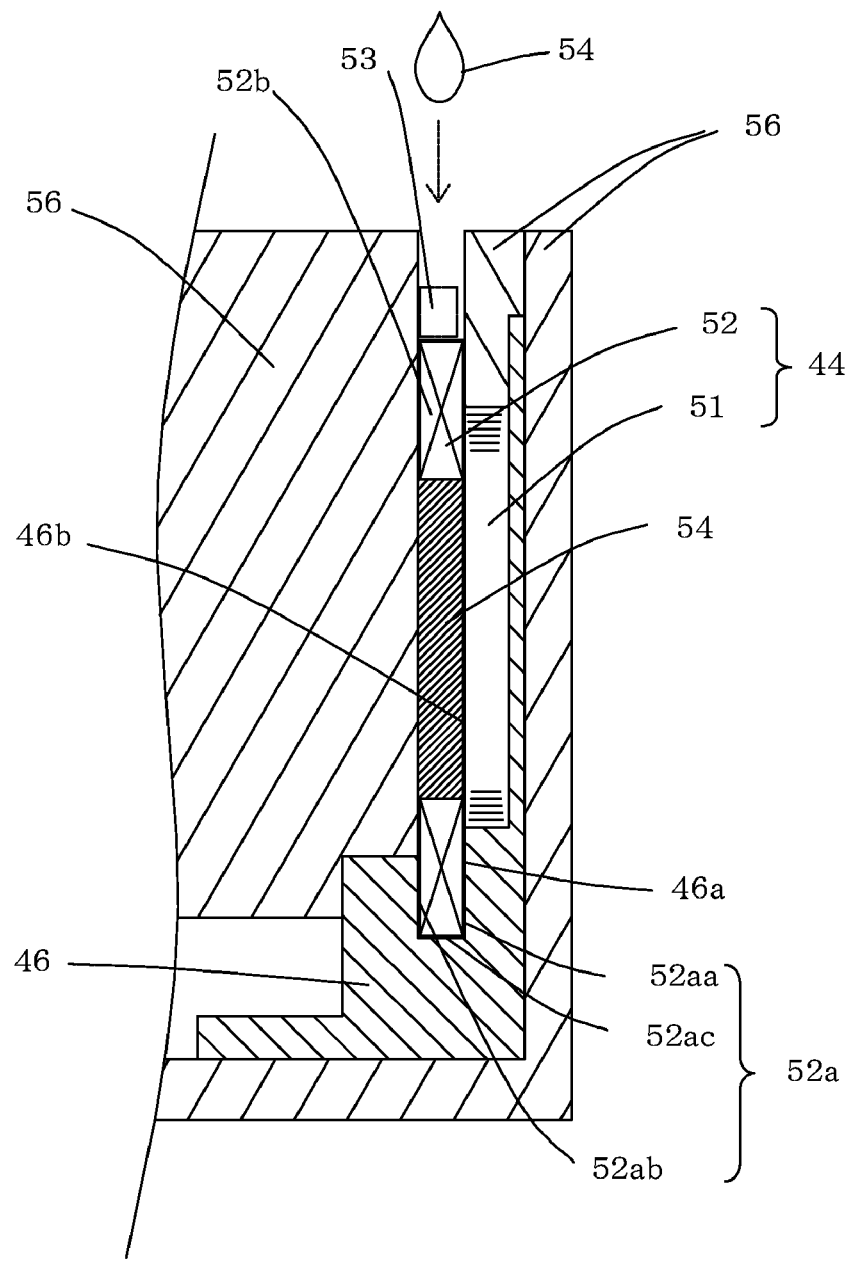
FIG. 15 is a view for illustrating the manufacturing method of the stator in the third embodiment.

FIGS. 14 and 15 are views for illustrating a manufacturing method of the stator 44. FIG. 14 shows the state in which the stator core 51 and the load side bracket 46 are assembled. FIG. 15 shows the state in which the stator 44 and the load side bracket 46 are unified.

In FIG. 14, in the load side bracket 46, the ceramic coat 46b is formed in the whole groove 46a by thermal spraying with a thermal spraying nozzle 57. In the stator core 51, the ceramic coat 46b is formed in the whole part 51b, where the stator core 51 touches the stator coil 52, by the thermal spraying with the thermal spraying nozzle 57. The accuracy of the forming position of the coat 46b can be heighten by the thermal spraying, and also the changes of the thickness of the coat 46 can be made to be extremely small. Next, the stator core 51 is fastened to the load side bracket 46 with not shown volts so that the stator core 51 may be held on the inner circumference of the load side bracket 46, on which the frame portion is formed.

Incidentally the thermal spraying (insulating treatment) of the stator core 51 and the thermal spraying of the load side bracket 46 may be performed in the same step. That is, after the fastening of the stator core 51 to the load side bracket 46, the ceramic coat 46b may be formed in the whole groove 46a and the whole part 51b, where the stator core 51 touches the stator coil 52, by the thermal spraying with the thermal spraying nozzle 57. In this case, the insulating treatment of the stator core 51 can be performed effectively.

Moreover, if the frame portion exists separately in the load side bracket 46, the stator core 51 and the frame portion may be firmly fixed to each other, and then the stator core 51 and the frame portion may be fastened to each other with not shown bolts. Alternatively, after the frame portion has been firmly fixed to the load side bracket 46, the stator core 51 may be fastened to the not shown load side bracket 46.

In FIG. 15, the stator coil 52 is mounted on the load side bracket 46 and the stator core 51 with a molding jig 56. In this state, the end surface 52ac of the load side coil end 52a is pushed against the groove 46a so as to adhere closely to the groove 46a. Then, by injecting the molding resin 54 from a position where the opposite load side coil end 52 is exposed, the stator coil 52 is molded. Thereby, the stator 44 and the load side bracket 46 are unified.

Incidentally, a gap for securing the insulation performance of the stator coil 52 is formed between the molding jig 56 and the stator coil 52. Concavo-convex spaces by the winding wire are formed between the ceramic coat 46b and the stator coil 52. Therefor, the molding resin 54 is filled up in the gap for securing the insulation performance of the stator coil 52 and the concavo-convex spaces by the winding wire.

Figure 16:
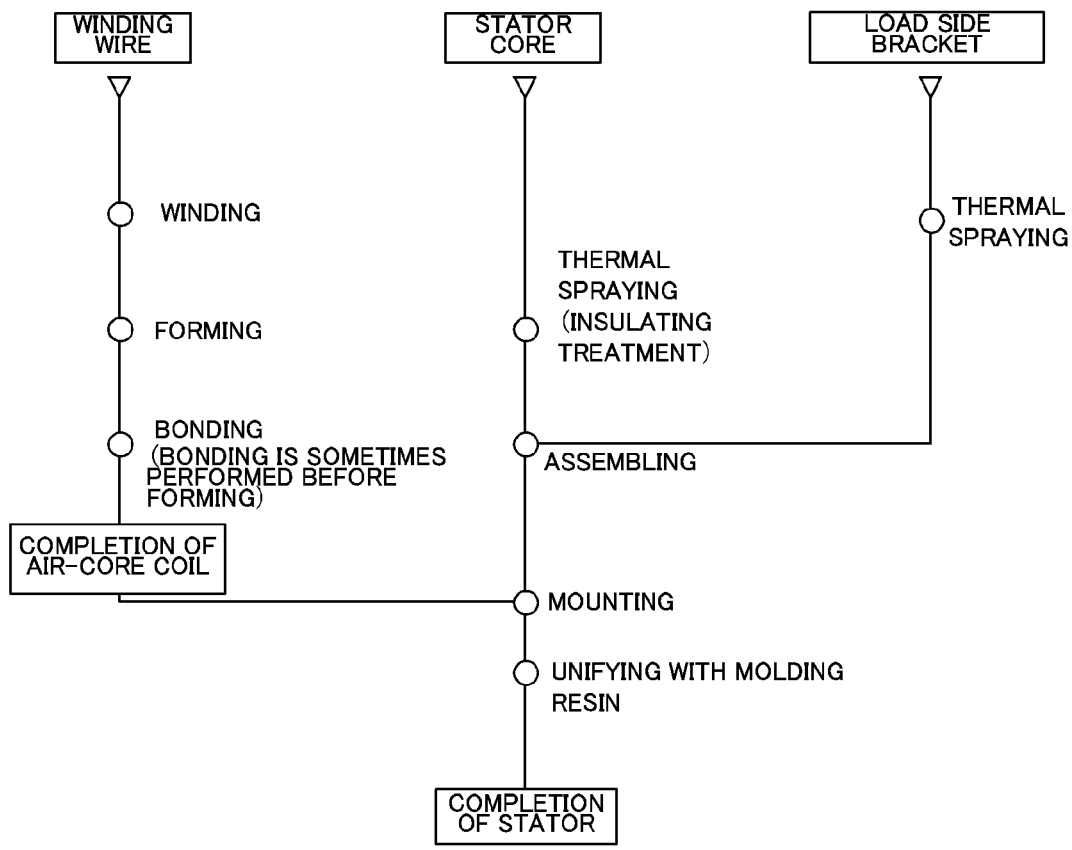
FIG. 16 is a flow chart showing a processing procedure for manufacturing the stator and a load side bracket in the third embodiment.

FIG. 16 is a flow chart showing a processing procedure of manufacturing the stator 44 and load side bracket 46 described above.

As shown in FIG. 16, in the stator coil 52, first, a winding wire having an insulating coat is wound. After that, the wound winding wire is pressurized with a mold to form the external shape of the wound winding wire. After that, wound pieces of the winding wire are bonded, and thereby an air-core coil is completed. Incidentally, the bonding of the wound pieces of the winding wire may be performed before forming the external shape of the wound winding wire.

In the stator core 51, the ceramic coat 46b is formed on the whole part 51b, where the stator core 51 touches the stator coil 52, by the thermal spraying with the thermal spraying nozzle 57. In the load side bracket 46, the ceramic coat 46b is formed in the whole groove 46a by the thermal spraying with the thermal spraying nozzle 57. After that, the stator core 51 is fastened to the load side bracket 46 with not shown bolts so as to be held on the inner circumference of the load side bracket 46, on which the frame portion is formed. Thereby, the stator core and the load side bracket 46 are assembled.

After that, the stator coil 52 is mounted in the load side bracket 46 and the stator core 51. In this state, the end surface 52ac of the load side coil end 52a is pushed against the groove 46a so as to adhere closely to the groove 46a. Then, by injecting the molding resin 54 from the position where the opposite load side coil end 52b is exposed, the stator coil 52 is molded. Thereby, the stator 44 and the load side bracket 46 are unified. Thereby, the assembly of the stator 44 and the load side bracket 46 is completed.

Fourth Embodiment

Figure 17:
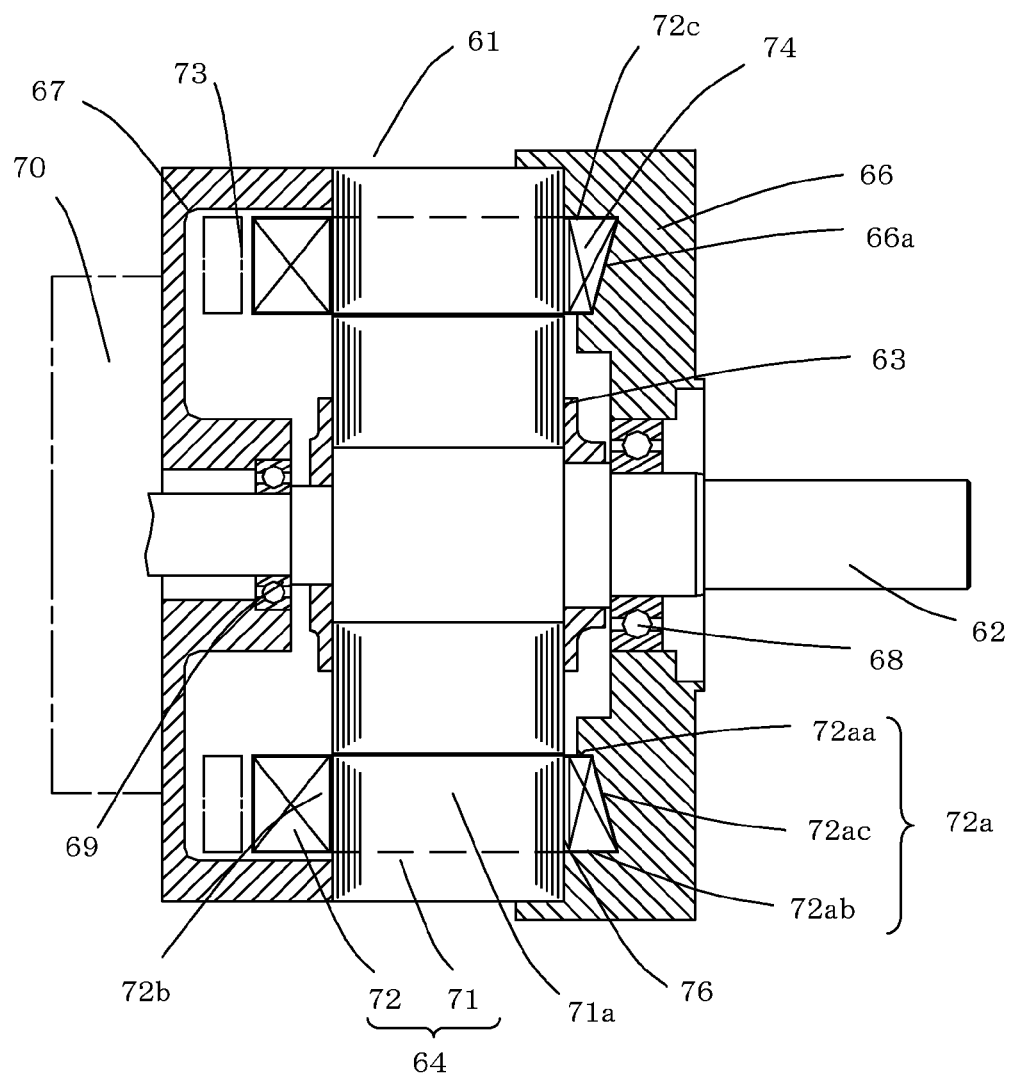
FIG. 17 is a sectional side view of a rotating electric machine according to a fourth embodiment.
Figure 18:
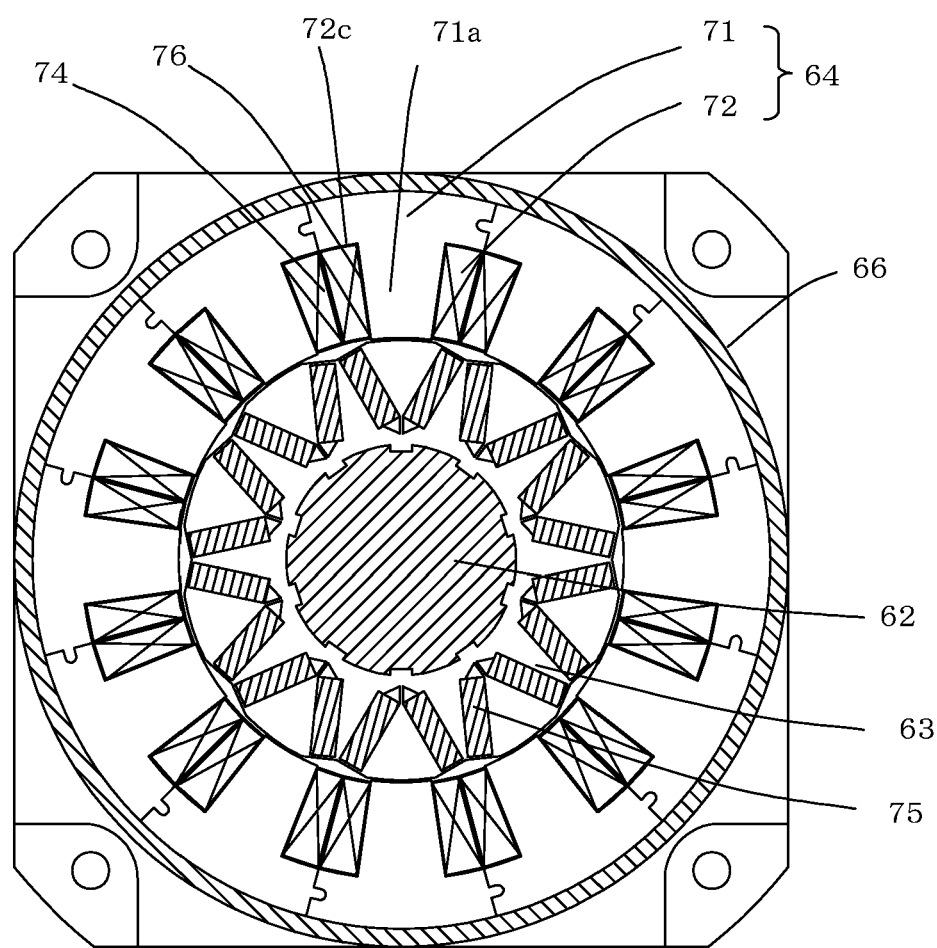
FIG. 18 is a sectional front view of the rotating electric machine according to the fourth embodiment.

FIG. 17 is a sectional side view of a rotating electric machine according to a fourth embodiment of the present invention. FIG. 18 is a sectional front view of the rotating electric machine.

In FIGS. 17 and 18, a rotating electric machine 61 is an embedded magnet type synchronous motor, and is mainly equipped with a rotating shaft 62, a rotor 63, a stator 64, a load side bracket 66, an opposite load side bracket 67, a load side bearing 68, an opposite load side bearing 69, and an encoder unit 70.

The stator 64 mainly includes a stator core 71 and a stator coil 72. The stator 64 is held on the inner circumference of the frame portion of the load side bracket 66 installed on the load side. The stator 64 is fastened to the load side bracket 66 together with the opposite load side bracket 67 with not shown bolts.

A sheet of insulating paper 76 is mounted on a teeth portion 71a of the stator core 71, and an insulating treatment is performed to the teeth portion 71a. After winding a winding wire with an insulating coat, the wound winding wire is pressurized with a mold so that the external shape of the wound winding wire is formed. After that, by bonding the pieces of wound winding wire, an air-core coil is formed. By mounting the air-core coil on the teeth portion 71a, which has been subjected to the insulating treatment, the stator coil 72 is formed.

The inner part of the stator coil 72 is formed to be larger than the teeth portion 71a in the axial direction of the stator coil 72. Moreover, the load side coil end 72a of the stator coil 72 includes an inner circumferential surface 72aa and an outer circumferential surface 72ab, each formed on a cylindrical surface, and an end surface 72ac formed on a conical surface. The opposite load side coil end 72b of the stator coil 72 is connected in a wire connection portion 73 in the neighborhood.

A groove 66a adhering closely to the inner circumferential surface 72aa, the outer circumferential surface 72ab, and the end surface 72ac of the load side coil end 72a is formed on the load side bracket 66.

The stator 64 and the load side bracket 66 are unified with the molding resin 54 in the state in which the end surface 72ac of the load side coil end 72a is pushed against the groove 66a so as to adhere closely to the groove 66a.

A ceramic coat 72c is formed in the whole surface of the stator coil 72, and secures the insulation performance of the stator coil 72. The thickness of the coat 72c is made to be the minimum thickness for being capable of securing the insulation performance. The thickness is set to be within a range of from 0.3 mm to 0.5 mm here. By the thickness of the ceramic coat 72c, the rotating electric machine 61 can be miniaturized with the insulation performance between the load side coil end 72a and the load side bracket 66 secured.

Moreover, the stator 64 and the load side bracket 66 are unified with a molding resin 74 in the state in which the end surface 72ac of the load side coil end 72a is pushed against the groove 66a so as to adhere closely to the groove 66a. Consequently, the heat generated in the stator coil 72 can be effectively dissipated to improve the cooling effect of the stator 72. Moreover, more electrification can be performed to the allowable temperature of the stator coil 72, and the rated output of the rotating electric machine 61 can be exceptionally improved.

Incidentally, although the coat 72c is formed on the whole surface of the stator coil 72 in the above description, the region of the formation of the coat 72c is not limited to that of the above description. The heat generated in the stator coil 72 is transferred from the load side coil end 72a to the load side bracket 66. Accordingly, the coat 72c may be formed only on, for example, the surface of the load side coil end 72a. Alternatively, the coat 72c may be formed at least on the inner surface adhering closely to the load side coil end 72a among the inner surfaces of the groove 66a of the load side bracket 66 in place of the surface of the stator coil 72. Even in these cases, the heat generated in the stator coil 72 can be effectively dissipated.

Moreover, although the frame portion is formed on the load side bracket 66 in the above description, the frame portion may be formed as a body separated from the load side bracket 66. In this case, the stator core 71 is fastened to the load side bracket 66 with not shown bolts in the state of being held on the inner circumference of the frame portion.

As shown in FIGS. 17 and 18, the rotor 63 is shaped in a cylindrical form. The rotor 63 is an embedded magnet type rotor, and is provided onto the outer circumferential surface of the rotating shaft 62. Permanent magnets 75 are laid in the inner part of the rotor 63.

The rotor 63 is rotatably held by the load side bracket 66 and the opposite load side bracket 67 with the load side bearing 68 and the opposite load side bearing 69, respectively, which are installed on the rotating shaft 62. The encoder unit 70 for detecting rotation positions is installed on the opposite load side of the rotating shaft 62.

Figure 19:
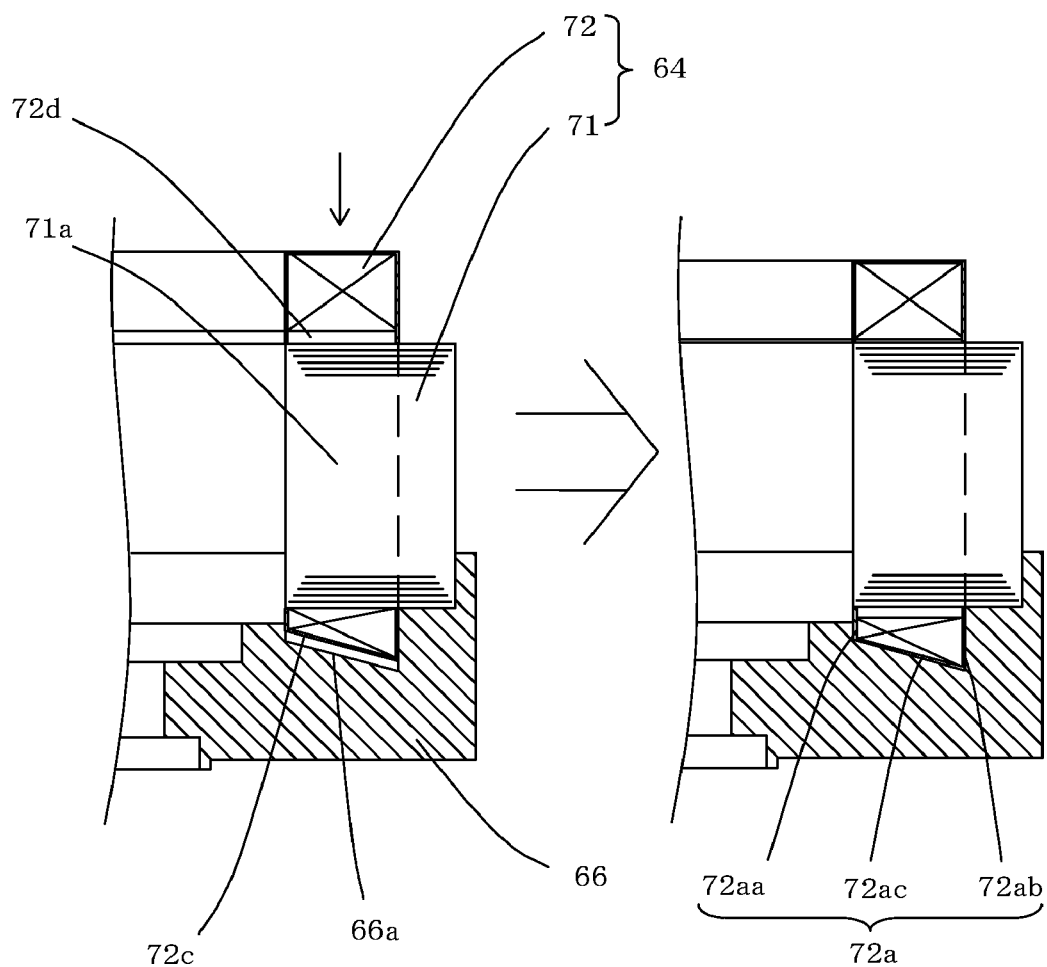
FIG. 19 is a view for illustrating a manufacturing method of a stator in the fourth embodiment.

FIG. 19 is a view for illustrating a manufacturing method of the stator 64. FIG. 19 shows the state in which the stator 64 and the load side bracket 66 are unified.

By a conventional manufacturing method, after the stator coil 72 has been fixed to the stator core 71, the stator core 71 is mounted on the load side bracket 66. Consequently, the stator coil 72 does not move in the axial direction thereof by the conventional manufacturing method.

On the other hand, in the present embodiment, the stator coil 72 is not fixed to the stator core 71 at the time of mounting the stator core 71 on the load side bracket 66. Moreover, the inner part of the stator coil 72 is formed to be larger than the teeth portion 71a in the axial direction. By these configurations, even after the stator core 71 has been mounted on the load side bracket 66, a space 72d is formed between the inner part of the stator coil 72 and the teeth portion 71a, and consequently the stator coil 72 can be moved into the axial direction thereof. Consequently, in the present embodiment, the stator 61 and the load side bracket 66 can be unified with the molding resin 74 with the end surface 72ac of the load side coil 72a pushed against the groove 66a so as to adhere closely to the groove 66a. The molding resin 74 is filled up in the space 72d.

Figure 20:
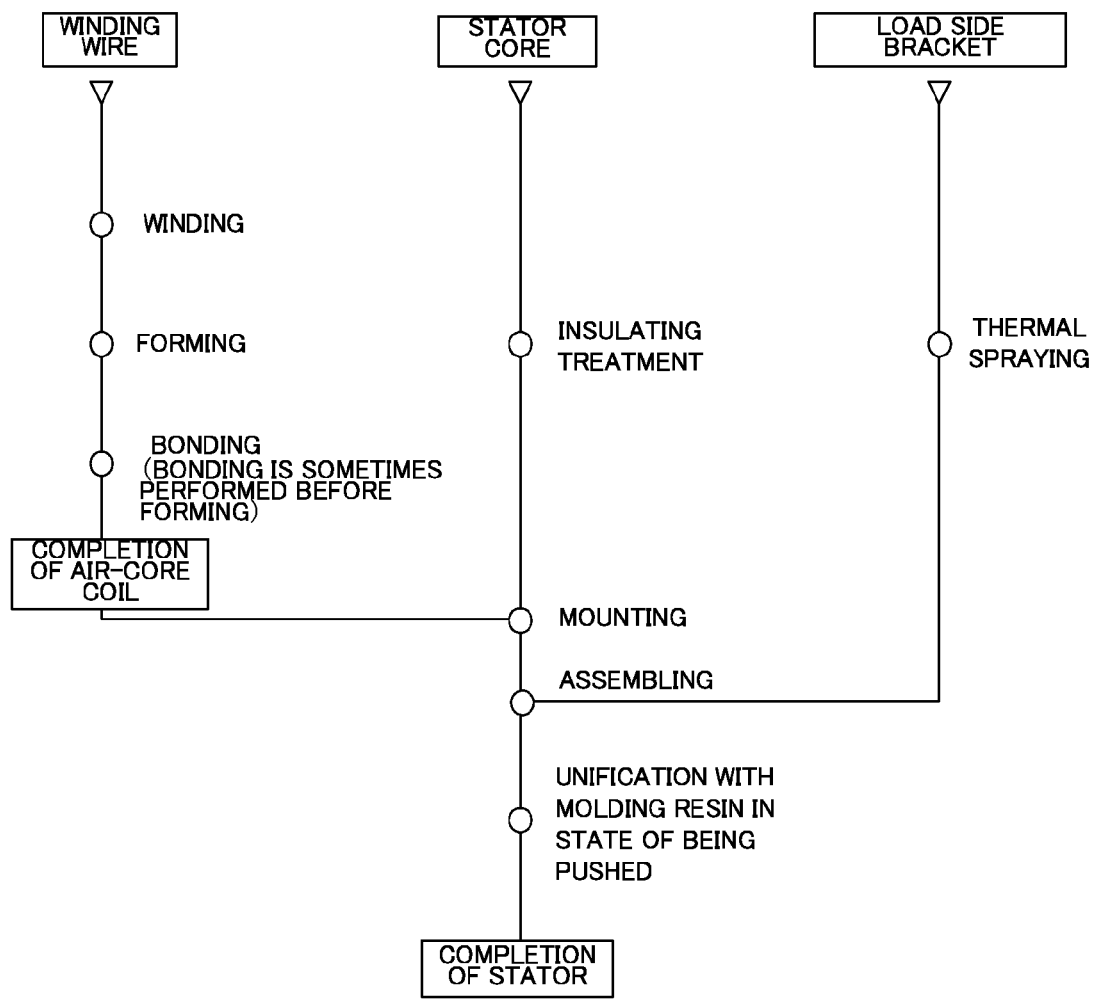
FIG. 20 is a flow chart showing a processing procedure for manufacturing the stator and a load side bracket in the fourth embodiment.

FIG. 20 is a flow chart showing a processing procedure of manufacturing the stator 64 and the load side bracket 66. Incidentally, FIG. 20 shows the processing procedure in the case where the coat 72c is formed in the groove 66a of the load side bracket 66.

As shown in FIG. 20, in the load side bracket 66, the ceramic coat 72c is formed in the whole groove 66a by thermal spraying with a not shown thermal spraying nozzle. In the stator core 71, an insulating treatment of the teeth portion 71a is performed.

In the stator coil 72, a winding wire having an insulating coat is wound. After that, the wound winding wire is pressurized with a mold to form the external shape of the wound winding wire. After that, wound pieces of the winding wire are bonded, and thereby an air-core coil is completed. Incidentally, the bonding of the wound pieces of the winding wire may be performed before forming the external shape of the wound winding wire. By mounting the air-core coil on the teeth portion 71a subjected to the insulating treatment, the stator coil 72 is formed. After that, the stator 64 is mounted on the load side bracket 66 (the stator 64 and the load side bracket 66 are assembled with each other). After that, the stator 64 and the load side bracket 66 are unified with the molding resin 74 with the end surface 72ac of the load side coil end 72a pushed against the groove 66a, in which the coat 72c is formed, so as to adhere closely to the groove 66a. Thereby, the assembly of the stator 64 and the load side bracket 66 is completed. Incidentally, the stator 64 and the load side bracket 66 may be unified with a varnish in place of the molding resin 74.

Fifth Embodiment

Figure 21:
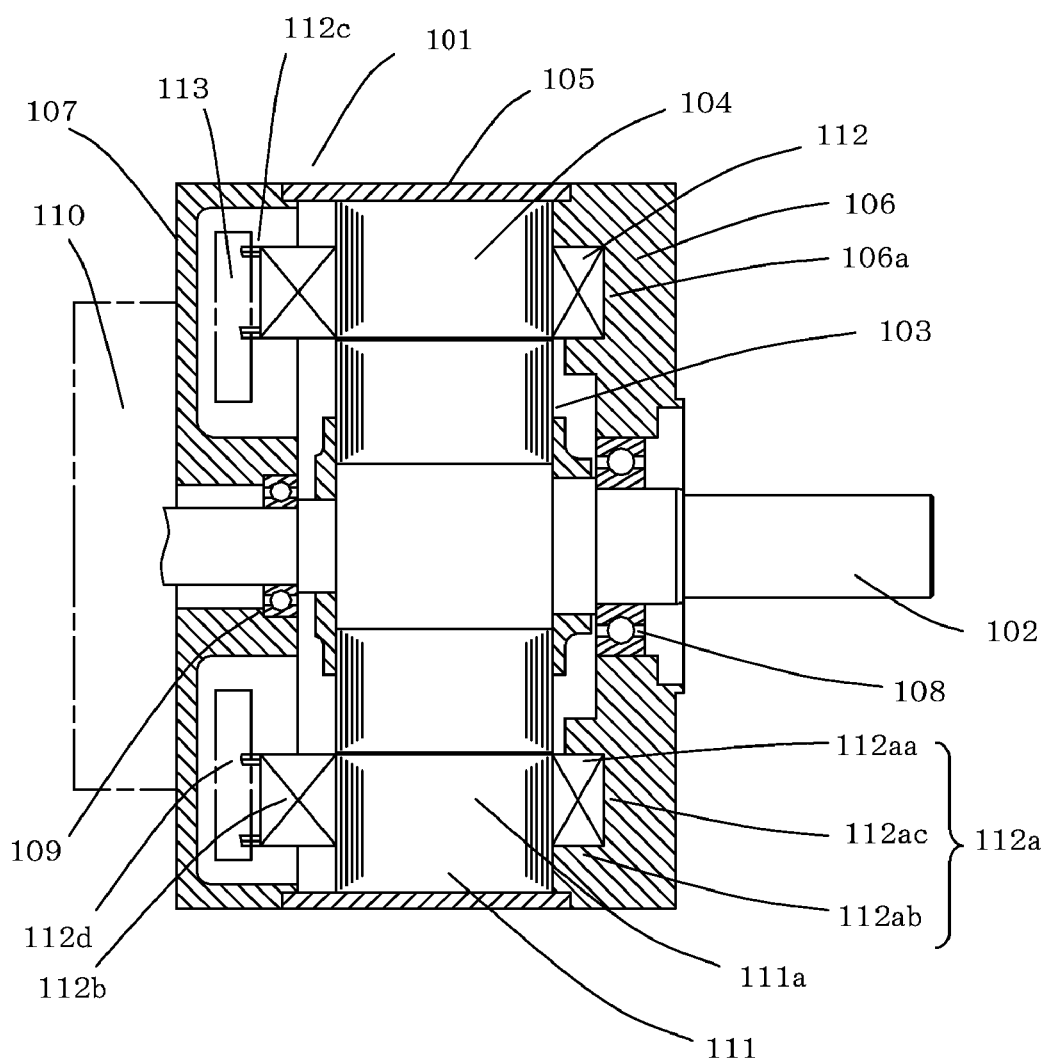
FIG. 21 is a sectional side view of a rotating electric machine according to a fifth embodiment.
Figure 22:
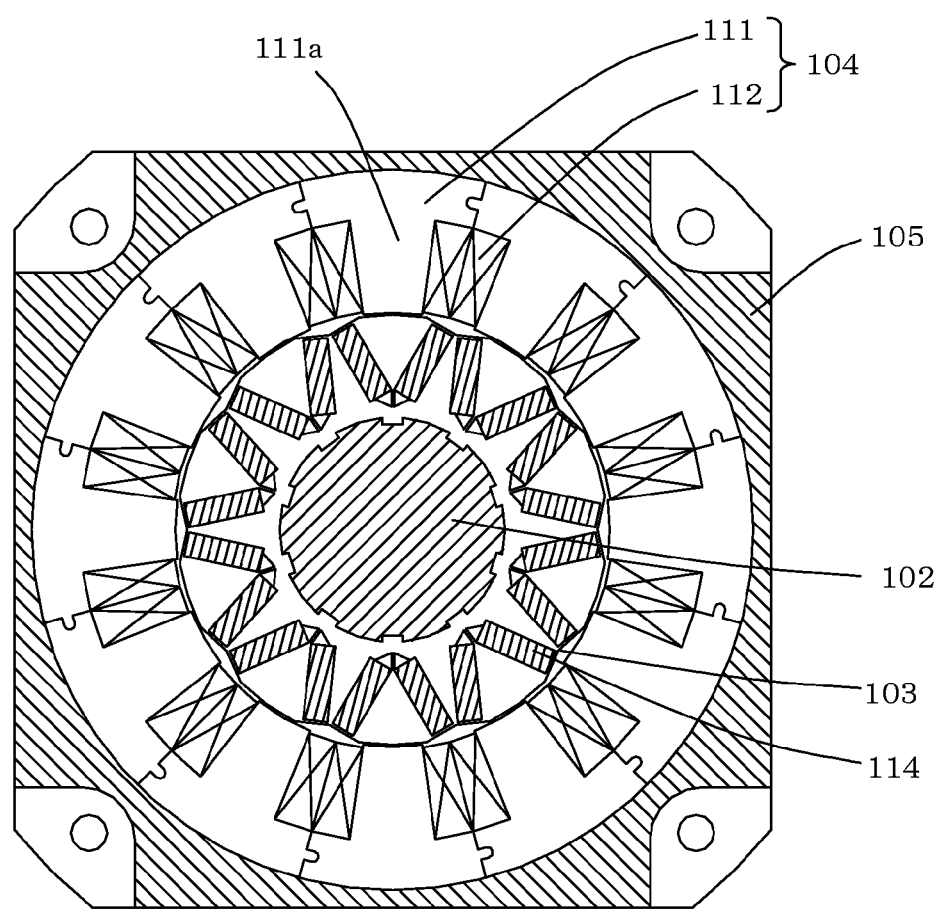
FIG. 22 is a sectional front view of the rotating electric machine according to the fifth embodiment.

FIG. 21 is a sectional side view of a rotating electric machine according to a fifth embodiment of the present invention. FIG. 22 is a sectional front view of the rotating electric machine according to the fifth embodiment.

In FIGS. 21 and 22, a rotating electric machine 101 is an embedded magnet type synchronous motor, and mainly includes a rotating shaft 102, a rotor 103, a stator 104, a frame 105, load side bracket 106, an opposite load side bracket 107, a load side bearing 108, an opposite load side bearing 109, and an encoder unit 110.

In FIGS. 21 and 22, the stator 104 mainly includes a stator core 111 and a stator coil 112. The stator 104 is held on the inner circumference of the tubular frame 105. The frame 105 is fastened to the load side bracket 106 installed on the load side together with the opposite load side bracket 107 with not shown bolts.

After a round copper wire having an insulating coat has been wound, the wound round copper wire is pressurized with a mold to form the external shape of the produced air-core coil. The stator coil 112 is formed by mounting the air-core coil on a teeth portion 111a of the stator core 111. A load side coil end 112a and an opposite load side coil end 112b are molded with a molding resin.

The load side bracket 106 includes a concave-shaped ring-like groove 106a. The load side coil end 112a of the stator coil 112 includes an inner circumferential surface 112aa and an outer circumferential surface 112ab, each formed on a cylindrical surface, and an end surface 112ac formed on a conical surface. The load side coil end 112a is fitted to the groove 106a of the load side bracket 106 to adhere closely to the groove 106a on the three surfaces of the inner circumferential surface 112aa, outer circumferential surface 112ab, and end surface 112ac of the load side coil end 112a with the molding resin, which is an insulator, put between them. Consequently, the heat generated in the stator coil 112 is effectively dissipated through the load side bracket 106, and the cooling effect of the stator coil 112 is improved. Moreover, more electrification can be performed to the allowable temperature of the stator coil 112, and the rated output thereof can be exceptionally improved.

One end 112c and the other end 112d of the air-core coil are formed on the outside of the air-core coil here. The one end 112c and the other end 112d of the winding wire is connected in a wire connection portion 113 in the neighborhood of the opposite load side coil end 112b of the stator coil 112. Consequently, both the sides of the inner circumferential surface 112aa and outer circumferential surface 112ab of the load side coil end 112a in the air-core coil in the present embodiment become flat. Consequently, damages of the insulating coat of the round copper wire are difficult to arise even if the round copper wire is pressurized from the outside thereof. Thus, the formation of the external shape of the air-core coil becomes easy. Moreover, by the formation of the external shape of the air-core coil, it becomes easy to make the inner circumferential surface 112aa and outer circumferential surface 112ab of the load side coil end 112a adhere closely to the groove 106a of the load side bracket 106 with the insulator put between them.

As shown in FIGS. 21 and 22, the rotor 103 is shaped in a cylindrical form. The rotor 103 is an embedded magnet type rotor, and is provided onto the outer circumferential surface of the rotating shaft 102. Permanent magnets 114 are laid in the inner part of the rotor 103. The rotor 103 is rotatably held by the load side bracket 106 and the opposite load side bracket 107 with the load side bearing 108 and the opposite load side bearing 109, respectively, which are installed on the rotating shaft 102. The encoder unit 110 for detecting rotation positions is installed on the opposite load side of the rotating shaft 102.

Incidentally, although the load side coil end 112a of the stator coil 112 is made to adhere closely to the groove 106a of the load side bracket 106 with the molding resin, which is an insulator, put between them in the present embodiment, but the adhering structure is not limited to the one mentioned above. As for a rotating electric machine for low voltages, the load side coil end 112a may be made to directly adhere closely to the groove 106a of the load side bracket 106 only with the insulating coat of the round copper wire.

FIGS. 23A-23I are views for illustrating a winding method of the air-core coil. FIGS. 23A-23I show a procedure for winding two round copper wires, each having an insulating coat, simultaneously. FIGS. 23A-23I show the winding procedure from the direction of the opposite load side in the case of mounting the air-core coil as a stator coil.

As shown in FIG. 23A, round copper wires 121 are wound by being lined horizontally at the lower part of a winding jig 122 having a shape resembling that of the teeth portion 111a of the stator core 111 closely in the part including the load side of the winding jig 122 except the part on the opposite load side thereof. The winding space 122a of the winding jig 122 is prepared in accordance with the wire diameters of the round copper wires 121, which are wound by the predetermined times.

Next, as shown in FIG. 23B, one-side ends 121ab of the round copper wires 121 are obliquely wound toward the upper part of other-side ends 121AB thereof in the opposite load side of the winding jig 122. After that, the one-side ends 121ab are wound by being horizontally lined while being made to adhere closely to the round copper wires 121 in the lower part in the part of the winding jig 122, including the load side, other than the opposite load side.

Next, as shown in FIG. 23C, the winding of FIG. 23B is repeated until the one-side ends 121ab reach the upper end of the winding jig 122. Thereby, the winding of a first layer ends.

Next, as shown in FIG. 23D, the one-side ends 121ab is horizontally wound by one round so as to be laid on the outer layer of the first layer in the upper end of the opposite load side of the winding jig 122. Similarly, also the other-side ends 121AB are horizontally wound by one round so as to be laid on the outer layer of the first layer at the lower end on the opposite load side of the winding jig 122.

Next, as shown in FIG. 23E, the one-side ends 121ab are wound obliquely downward on the opposite load side of the winding jig 122. The one-side ends 121ab are wound by being lined horizontally while being made to adhere closely to the round copper wires 121 on the upper par in the part, including the load side of the winding jig 122, other than the opposite load side. This winding is repeated until the one-side ends 121ab reach the winding of the other-side ends 121AB existing at the lower end of the winding jig 122. Thereby, the winding of a second layer ends.

Next, as shown in FIG. 23F, the one-side ends 121ab is horizontally wound by one round so as to be laid on the outer layer of the second layer at the lower end of the opposite load side of the winding jig 122. Similarly, also the other-side ends 121AB are horizontally wound by one round so as to be laid on the outer layer of the second layer at the lower end of the opposite side of the winding jig 122.

Next, as shown in FIG. 23G, the one-side ends 121ab are obliquely wound so as to be laid on the round copper wires 121 in the layer of the inner part on the opposite load side of the winding jig 122 for a lead of the winding. After that, the one-side ends 121ab are wound by being horizontally lined while being made to adhere closely to the round copper wires 121 in the lower part in the part, including the load side of the winding jig 122, other than the opposite load side thereof. This winding is repeated until the one-side ends 121ab reach the upper end of the winding jig 122.

Since then, the winding of a predetermined number of layers ends, as shown in FIG. 23I, by repeating the processing of FIGS. 23D-23G, and an air-core coil 130 is formed.

By such a winding method, two round copper wires, each having an insulating coat, can be wound at the same time, and an air-core coil can be formed. Moreover, the round copper wires 121 can be horizontally lined in the part, including the load side of the air-core coil 130, other than opposite load side thereof.

Figure 24A:
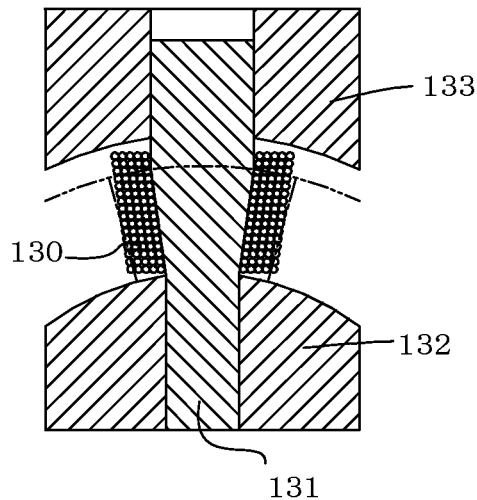
FIGS. 24A, 24B, 24C, and 24D are views for illustrating a method for forming the external shape of the air-core coil by pressurizing the air-core coil in the fifth embodiment with a mold.
Figure 24B:
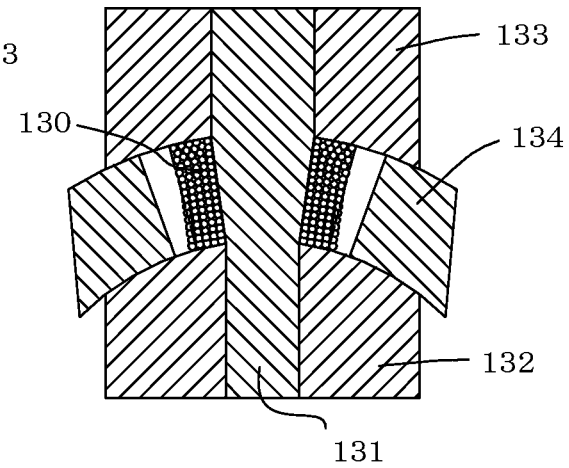
Figure 24C:
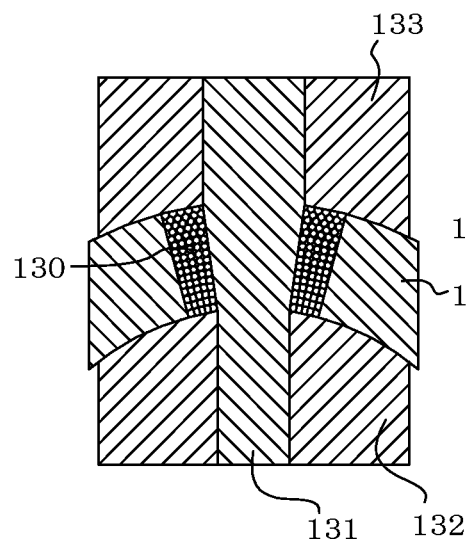
Figure 24D:
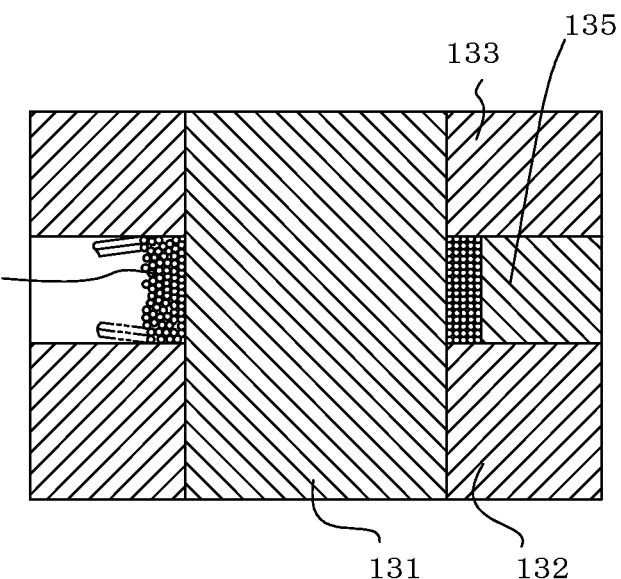

FIGS. 24A-24D are views for illustrating a method of forming the external shape by pressurizing the air-core coil 130 with a mold. FIGS. 24A-24C are sectional views of an air-core coil 130, a core pin 131, an inner circumferential surface punch 132, and an outer circumferential surface punch 133 viewed from the direction of load side when the air-core coil 130 is mounted as the stator coil. FIG. 24D is a sectional side view of the air-core coil 130, the core pin 131, the inner circumferential surface punch 132, the outer circumferential surface punch 133, and an end surface punch 135 in the state shown in FIG. 24C.

As shown in FIG. 24A, the air-core coil 130 is mounted on the core pin 131 of a pressurizing jig. After that, the inner circumferential surface punch 132 and the core pin 131 are fixed. In this state, the outer circumferential surface punch 133 is moved to the lower part to pressurize the air-core coil 130. At this time, the air-core coil 130 is set to be pressurized so that the height thereof in the vertical direction may become a set size.

Next, as shown in FIG. 24B, a boundary surface punch 134 is moved from the both sides of the air-core coil 130 into the center of the circumferential direction of the air-core coil 130 to pressurize the air-core coil 130. Then, the air-core coil 130 becomes the state shown in FIG. 24C.

Next, as shown in FIG. 24D, the end surface punch 135 is last moved from the load side of the air-core coil 130 to the core pin 131 to pressurize the air-core coil 130. In this state, by setting the temperature of the air-core coil 130 to the temperature at which the insulating coat of the round copper wire fuses, the air-core coil 130, the external shape of which has been formed, is completed.

Incidentally, since the heat generated in the stator coil 112 is dissipated through the load side bracket 106, the air-core coil 130 is not pressurized from the opposite load side.

FIGS. 25A and 25B are views of the air-core coil 130, the winding of which has ended, from two directions. FIG. 25A is a view of the air-core coil 130 viewed from the opposite load side, and FIG. 25B is a view of the air-core coil 130 viewed from the direction perpendicular to the axial direction.

In FIGS. 25A and 25B, the one-side ends 121ab and the other-side ends 121AB of the winding wires of the air-core coil 130 are formed on the outside of the air-core coil 130. That is, the top and bottom sides of the air-core coil 130 are flat. Consequently, even if the external shape of the air-core coil 130 is formed, the damages of the insulating coats of the round copper wires are hard to arise. That is, the forming of the external shape of the air-core coil 130 becomes easy. Moreover, the one-side ends 121ab and the other-side ends 121AB of the winding wires of the air-core coil 130 are formed on the outside of the air-core coil 130, and the winding wires are horizontally lined in the part, including the load side of the air-core coil 130, other than the opposite load side. Consequently, the external shapes of the inner circumferential surface 112aa, outer circumferential surface 112ab, and end surface 112ac of the load side coil end 112a can be precisely pressurized to be formed. Thereby, the load side coil end 112a can be made to adhere more closely to the load side bracket 106 through the insulator. As a result, the heat generated in the stator coil 112 can be effectively dissipated through the load side bracket 106 to improve the cooling effect of the stator coil 112.

Although the air-core coil 130 produced by winding two round copper wires, each having a insulating coat, at the same time is used in the present embodiment in order to prevent the increase of the resistances of the winding wires owing to the skin effect, an air-core coil produced by winding one round copper wire may be used. Incidentally, it is needless to say that also the air-core coil produced by winding one round copper wire can be produced by a winding method similar to that of producing the air-core coil having the simultaneously wound two round copper wires.

Sixth Embodiment

FIG. 26 is a sectional front view of a part of a stator of a rotating electric machine according to a sixth embodiment.

The respect in which the rotating electric machine according to the sixth embodiment differs from the rotating electric machine according to the fifth embodiment is that steps of the layers of a winding wire are formed in the inner circumferential portion of an air-core coil. In the following, the different point will be chiefly described.

In FIG. 26, after two round copper wires, each having an insulating coat, have been wound, the wound round copper wires are pressurized with a mold to form the external shape of the produced air-core coil. A stator coil 162 is formed by mounting the air-core coil on a teeth portion 161a of a stator core 161. A stator is configured by joining a plurality of stator cores 161 in a cylindrical form. The neighborhood of the stator coil 162 is molded with a forming resin 163.

The steps of the layers of the winding wire are formed in the inner part of the air-core coil, and no steps of the layers of the winding wire are formed on the outer part of the air-core coil. The outer part of the air-core coil is nearly flat. No steps of the layers of the winding wire are similarly formed also on the end surface of a not shown load side coil end here, and the end surface of the load side coil end becomes nearly flat. Consequently, the load side coil end of the stator coil 162 can be made to fit to adhere closely to the groove 106a of the load side bracket 106 on the three surfaces of the inner circumferential surface, outer circumferential surface, and end surface of the load side coil end of the stator coil 162 with the molding resin, which is an insulator, put between them. Consequently, the heat generated in the stator coil 162 is effectively dissipated through the load side bracket 106, and the cooling effect of the stator coil 162 is improved.

Generally, the shape of the mounting portion of a stator coil mounted on the teeth portion of the stator coil is frequently a fan shape. The deformation given to an air-core coil can be reduced by pressuring the air-core coil, having the shape of the inner part thereof resembled to the shape of the mounting portion of the stator coil by forming the steps of the layers of the winding wire in the inner part of the air-core coil, with a mold, in comparison with the case of pressuring the air-core coil having no formed steps of the layers of the winding wire in the inner part of the air-core coil.

Incidentally, conventional rotating electric machines generally have stator coils having the steps of the layers of the winding wires on the outer sides of the air-core coils. However, the flatness of the outer side of an air-core coil is important for a rotating electric machine in which the end surface of the load side coil end and the like are made to adhere closely to the groove of the load side bracket with an insulator put between them. Moreover, it does not matter for such a rotating electric machine that the steps of the layers of the winding wire are formed in the inner part of the air-core coil of the machine.

FIGS. 27A-27I are views for illustrating a winding method of an air-core coil according to the sixth embodiment. FIGS. 27A-27H show a procedure for winding two round copper wires, each having an insulating coat, simultaneously from the direction of the opposite load side when the air-core coil is mounted as a stator coil. FIG. 27I is a sectional side view of the air-core coil and a winding jig in the state shown in FIG. 27H.

As shown in FIG. 27A, round copper wires 171 are wound by being horizontally lined at the lower part of a winding jig 172 having steps on the winding portion thereof and being divided into a plurality of parts, which will be described later, which lower part includes the load side of the winding jig 172 and is not the opposite load side.

Next, one-side ends 171ab of the round copper wires 171 are obliquely wound toward the upper part of other-side ends 171AB of the round copper wires at the opposite load side of the winding jig 172. After that, the one-side ends 171ab are wound by being horizontally lined while being made to adhere closely to the round copper wires 171 in the lower part in the part of the winding jig 122, including the load side, other than the opposite load side.

Next, as shown in FIG. 27B, the one-side ends 171ab are obliquely wound on the opposite load side of the winding jig 172. The one-side ends 171ab are wound by being horizontally lined while being made to adhere closely to the round copper wires 171 in the lower part in the part of the winding jig 172, including the load side, other than the opposite load side. By repeating the winding until the one-side ends 171ab reach the upper end of the winding jig 172, the winding of a first layer ends.

Next, as shown in FIG. 27C, the other-side ends 171AB is horizontally wound by one round so as to be laid on a trough of the first layer round copper wires 171 at the lower end of the opposite load side of the winding jig 172. Similarly, the one-side ends 171ab are horizontally wound by one round so as to be laid on a trough of the first layer round copper wires 171 at the upper end on the opposite load side of the winding jig 172. After that, the one-side ends 171ab are obliquely wound on the opposite load side of the winding jig 172. The one-side ends 171ab are wound by being horizontally lined while being made to adhere closely to the round copper wires 171 on the upper par in the part of the winding jig 172, including the load side, other than the opposite load side. This winding is repeated until the one-side ends 171ab reach the winding of the other-side ends 171AB existing at the lower end of the winding jig 172, and thereby the winding of a second layer ends.

Next, as shown in FIGS. 27D and 27E, the other-side ends 171AB are horizontally wound by one round so as to be laid on the trough of the second layer round copper wires 171 at the lower end of the opposite load side of the winding jig 172. Similarly, the one-side ends 171ab are horizontally wound by one round so as to be laid on the trough of the second layer round copper wires 171 at the lower end of the opposite load side of the winding jig 172.

After that, the one-side ends 171ab are obliquely wound on the opposite load side of the winding jig 172. The one-side ends 171ab are wound so as to be horizontally lined while being made to adhere close to the round copper wires 171 in the lower part in the part of the winding jig 172, including the load side, other than the opposite load side. This winding is repeated until the one-side ends 171ab reach the upper end of the winding jig 172, and thereby the winding of a third layer ends.

Since then, by the processing of FIGS. 27C-27E is repeated, the winding of a predetermined number of layers ends, and the air-core coil is formed as shown in FIG. 27H.

As shown in FIG. 27I, steps are formed on a winding portion 172a on the load side of the winding jig 172 in order to make the outer side of the air-core coil flat, which outer side becomes the end surface of the load side coil end of the stator coil 162. However, no steps are formed in a winding portion 172b on the opposite load side of the winding jig 172, on which opposite load side round copper wires 171 are obliquely wound for the lead of the winding.

By such a winding method, two round copper wires, each having an insulating coat, can be simultaneously wound on the winding jig 172 having the steps in the winding portion thereof to be divided into a plurality of parts, and an air-core coil can be formed. Moreover, the one-side ends 171ab and the other-side ends 171AB of the winding wires in the air-core coil are formed on the outer side of the air-core coil, and the winding wires are horizontally lined in the part of the air-core coil, including the load side thereof, other than the opposite load side thereof.

Incidentally, although the round copper wires 171 of the outer side layer are wound on the troughs of the round copper wires 171 of the inner side layer by the winding method of the present embodiment, the round copper wires 171 of the outer side layer may be wound right above the round copper wires 171 of the inner side layer similarly to the winding method of the fifth embodiment.

Figure 28A:
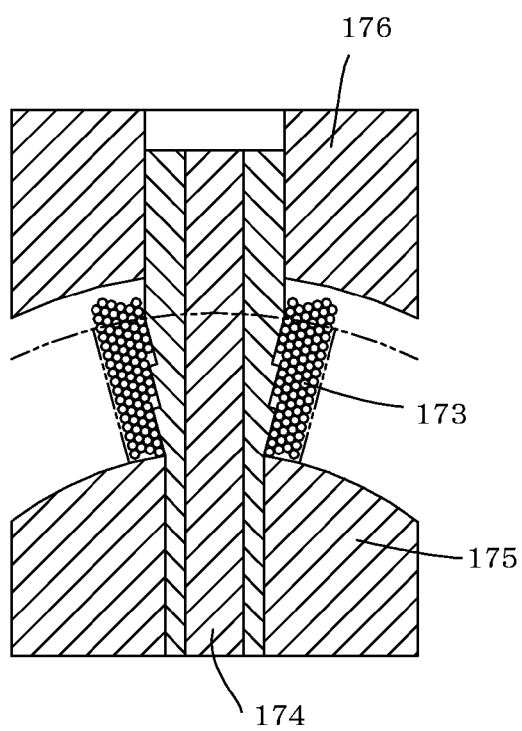
FIGS. 28A and 28B are views for illustrating a method of forming the external shape of the air-core coil in the sixth embodiment by pressurizing the air-core coil with a mold.
Figure 28B:
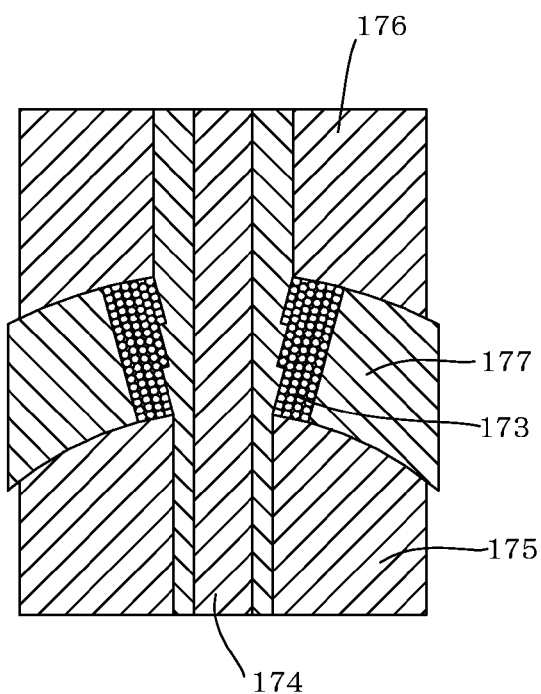

FIGS. 28A and 28B are views for illustrating a method of forming the external shape by pressurizing an air-core coil 173 with a mold. FIGS. 28A and 28B are sectional front views of the air-core coil 173 and a pressurizing jig viewed from the direction of a load side when the air-core coil 173 is mounted as a stator coil. FIG. 28A shows the state before pressurizing with the pressurizing jig, and FIG. 28B shows the state after the pressurizing.

In FIGS. 28A and 28B, the air-core coil 173 removed from the winding jig 172, an inner circumferential surface punch 175, and an outer circumferential surface punch 176 are mounted on a core pin 174 of the pressurizing jig, which core pin 174 includes a winding portion having steps and divided into a plurality of parts by the steps, which core pin 174 will be described later. Since then, the procedure of pressuring the air-core coil 173 using the outer circumferential surface punch 176, the boundary surface 177, and a not shown end surface punch in the state of fixing the inner circumferential surface punch 175 and the core pin 174 is the same as that of the fifth embodiment, and accordingly the description of the procedure is omitted here.

Figure 29A:
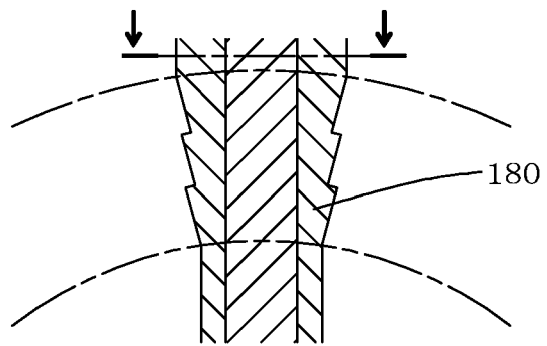
FIGS. 29A, 29B, 29C, 29D, 29E, 29F, and 29G are views for illustrating the structure of a winding jig in sixth embodiment, which winding jig has steps in the winding portion thereof and is divided into a plurality of parts.
Figure 29B:
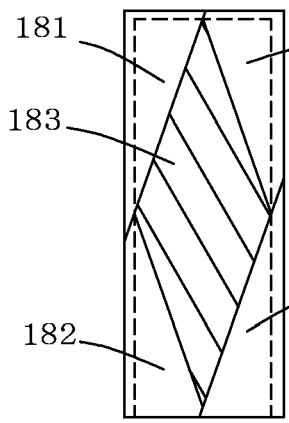
Figure 29C:
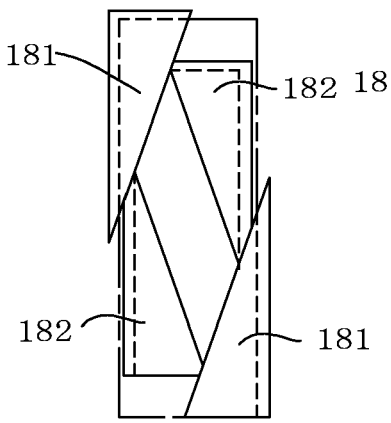
Figure 29D:
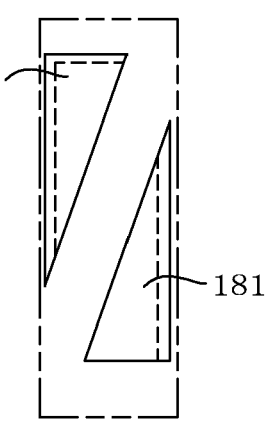
Figure 29E:
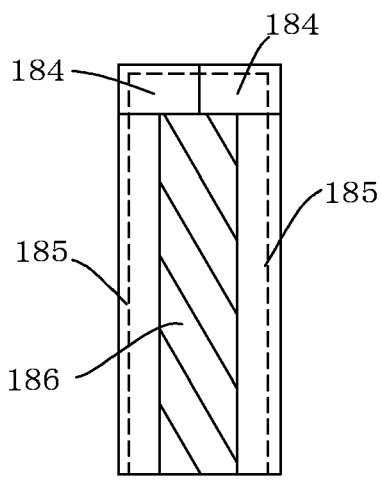
Figure 29F:
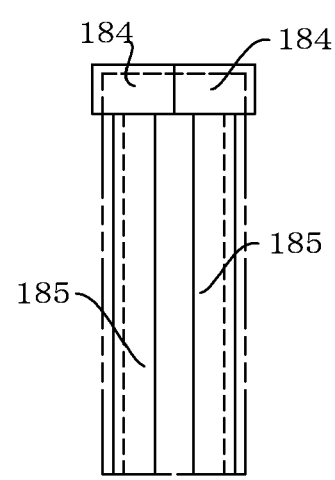
Figure 29G:
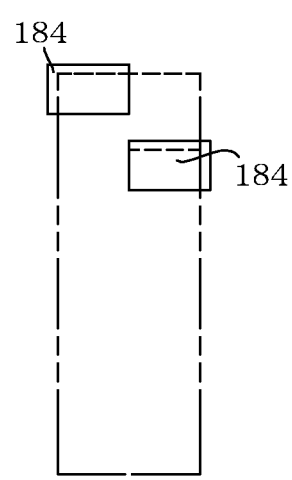

FIGS. 29A-29G are views for illustrating the structure of the winding jig 172 having steps on the winding portion thereof and being divided into a plurality of parts, which winding jig 172 are shown in FIGS. 27A-27I. FIG. 29A is a sectional view of the winding jig 172 viewed from the load side. FIGS. 29B-29D are top views of the winding jig 172 and show a first structure example of the winding jig 172. FIGS. 29E-29G are top views of the winding jig 172 and show a second structure example of the winding jig 172. Broken lines shown in FIGS. 29B-29G express the minimum shape of the inner part of the air-core coil.

Since the steps are formed on the winding portion 180 of the winding jig 172, it is needed to divide the winding jig 172 into a plurality of parts in order to remove the wound air-core coil from the winding jig 172.

Accordingly, as shown in FIG. 29B, the winding jig 172 is configured of five parts, which are two first slide cores 181, two second slide cores 182, and a fixed core 183. FIGS. 29C and 29D show a procedure of removing the five parts from the air-core coil by sliding them to the inner part of the air-core coil in order.

In FIGS. 29B-29D, first the fixed core 183 is removed from the air-core coil. Next, the two second slide cores 182 are slid to the inner part of the air-core coil to be removed from the air-core coil. The two first slide cores 181 are lastly slid to the inner part of the air-core coil to be removed from the air-core coil. As described above, the two second slide cores 182 and the two first slide cores 181 can be removed from the air-core coil by being slid into the diagonal line directions toward the inner part of the air-core coil.

Moreover, as shown in FIG. 29E, the winding portion 180 may be configured of five parts that are two first slide cores 184, two second slide cores 185, and a fixed core 186. FIGS. 29F and 29G show a procedure of removing the five parts from the air-core coil by sliding the five parts into the inner part of the air-core coil in order.

In FIGS. 29E-29G, the fixed core 186 is first removed from the air-core coil. No steps are formed on the opposite load side of the winding portion 180 here. Accordingly, by sliding the two second slide cores 185 into the inner part of the air-core coil in the horizontal direction, the second slide cores 185 can be removed from the air-core coil. On the other hand, the two first slide cores 184 can be removed from the air-core coil by being slid into the inner part in the horizontal direction and buy being slid into the axial direction.

As described above, by using the winding jig 17 divided into a plurality of parts, the air-core coil having the steps for the winding wires in the inner part thereof can be manufactured.

Incidentally, the core pin 174 of the pressurizing jig shown in FIGS. 28A and 28B may be made to have the structure similar to that of the winding jig 172 to be removed from the air-core coil by the similar method.

Figure 30:
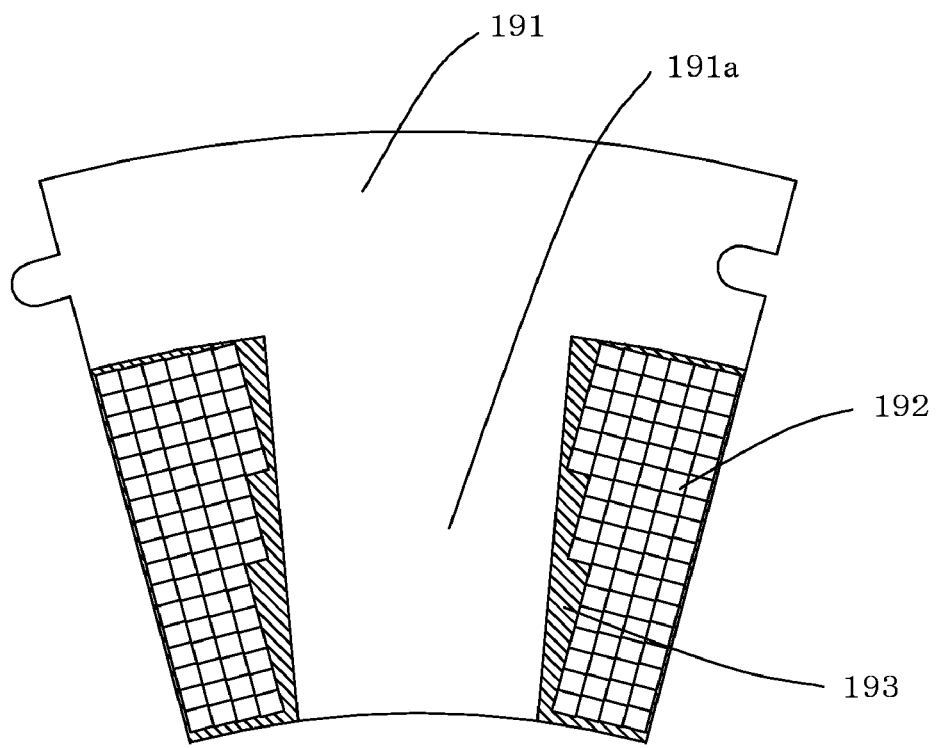
FIG. 30 is a sectional front view of a part of a stator using an air-core coil wound with a rectangular copper wire having a rectangular cross section or a square copper wire having a square cross section.

Incidentally, although the air-core coil is formed using the round copper wires, each having an insulating coat, in the above embodiments, the air-core coil is not limited to this one. As shown in FIG. 30, the air-core coil may be formed using a rectangular copper wire having a rectangular cross section or a square copper wire having a square cross section, each having an insulating coat. In FIG. 30, a reference numeral 191 denotes a stator core; a reference numeral 191a denotes the teeth portion of the stator core 191; a reference numeral 192 denotes a rectangular copper wire or a square copper wire; and a reference numeral 193 denotes a forming resin.

In this case, it becomes easy to form the outer side of the air-core coil to be flatter only by winding in comparison with the case of using a round copper wire. Moreover, if the external shape of the air-core coil is formed by pressurizing the air-core coil with a mold, the use of the rectangular copper wire or the square copper wire can reduce the deformation given to the air-core coil. Alternatively, the use of the rectangular copper wire or the square copper wire makes it possible to omit the step of pressurizing the air-core coil with a mold to form the external shape of the air-core coil.

What is claimed is:

1. A rotating electric machine, comprising:
    a tubular frame;
    a stator including a stator core fitted to an inner circumferential surface of the frame to be firmly fixed thereon, and a stator coil mounted on the stator core so that a load side coil end and an opposite load side coil end project from a load side end surface and an opposite load side end surface of the stator core, respectively;
    a load side bracket provided on a load side of the frame, the load side bracket having a groove formed on the bracket for inserting the load side coil end therein, wherein one or more surfaces including at least an end surface among an inner circumferential surface, an outer circumferential surface, and the end surface of the load side coil end adhere closely to the inner surface of the groove through an insulating member without a gap therebetween;
    an opposite load side bracket provided on an opposite load side of the frame;
    a rotating shaft rotatably supported by the load side bracket and the opposite load side bracket through a load side bearing and an opposite load side bearing, respectively; and
    a rotor attached to an outer circumferential surface of the rotating shaft,
    wherein an outer surface of the load side coil end is pressurized and is formed so that a shape of the one or more surfaces becomes a same as a shape of the inner surface of the groove which adheres closely to the one or more surfaces.

2. The rotating electric machine according to claim 1, wherein the load side bracket is made of an aluminum alloy.

3. The rotating electric machine according to claim 1, wherein the stator core includes a plurality of teeth portions forming slots in an inner circumferential portion, and the stator coil, having an inner part formed to be longer in an axial direction thereof than that of each of the plurality of teeth portions, is mounted on each of the plurality of teeth portions.

4. The rotating electric machine according to claim 1, wherein the stator core is formed to be a cylinder, and the stator coil is put on an inner circumferential surface of the stator core with a ceramic coat formed between the stator coil and the inner circumferential surface.

5. The rotating electric machine according to claim 4, wherein the ceramic coat formed on the inner circumferential surface of the stator core is formed at a part of the inner circumferential surface of the stator core, the part touching the stator coil.

6. The rotating electric machine according to claim 1, wherein the stator coil is wound around the stator core by the distributed winding.

7. The rotating electric machine according to claim 1, wherein the stator coil comprises a wound round wire.

8. The rotating electric machine according to claim 1, wherein the insulating member comprises a ceramic coat.

9. The rotating electric machine according to claim 1, wherein the one or more surfaces includes at least the end surface among the inner circumferential surface and the end surface of the load side coil end, which adhere closely to the inner surface of the groove through the insulating member without a gap therebetween.

10. A rotating electric machine, comprising:
    a tubular frame;
    a stator including a stator core fitted to an inner circumferential surface of the frame to be firmly fixed thereon, and a stator coil mounted on the stator core so that a load side coil end and an opposite load side coil end project from a load side end surface and an opposite load side end surface of the stator core, respectively;

a load side bracket provided on a load side of the frame, the load side bracket having a groove formed on the bracket for inserting the load side coil end therein, wherein the load side coil end is formed using pressure to an outer surface of the load side coil end so that one or more surfaces including at least an end surface among an inner circumferential surface, an outer circumferential surface, and the end surface of the load side coil end extend along the inner surface of the groove to face the inner surface of the groove, and the one or more surfaces adhere closely to the inner surface of the groove through an insulating member without a gap between the one or more surfaces and the inner surface of the groove;

an opposite load side bracket provided on an opposite load side of the frame;

a rotating shaft rotatably supported by the load side bracket and the opposite load side bracket through a load side bearing and an opposite load side bearing, respectively; and a rotor attached to an outer circumferential surface of the rotating shaft.

11. The rotating electric machine according to claim 10, wherein the load side bracket is made of an aluminum alloy.

12. The rotating electric machine according to claim 10, wherein the stator core includes a plurality of teeth portions forming slots in an inner circumferential portion, and the stator coil, having an inner part formed to be longer in an axial direction thereof than that of each of the plurality of teeth portions, is mounted on each of the plurality of teeth portions.

13. The rotating electric machine according to claim 10, wherein the stator core is formed to be a cylinder, and the stator coil is put on an inner circumferential surface of the stator core with a ceramic coat formed between the stator coil and the inner circumferential surface.

14. The rotating electric machine according to claim 13, wherein the ceramic coat formed on the inner circumferential surface of the stator core is formed at a part of the inner circumferential surface of the stator core, the part touching the stator coil.

15. The rotating electric machine according to claim 10, wherein the stator coil is wound around the stator core by the distributed winding.

16. The rotating electric machine according to claim 10, wherein the stator coil comprises a wound round wire.

17. The rotating electric machine according to claim 10, wherein the insulating member comprises a ceramic coat.

18. The rotating electric machine according to claim 10, wherein the one or more surfaces includes at least the end surface among the inner circumferential surface and the end surface of the load side coil end, which adhere closely to the inner surface of the groove through the insulating member without a gap therebetween.

19. A rotating electric machine, comprising:
a tubular frame;
a stator including a stator core fitted to an inner circumferential surface of the frame to be firmly fixed thereon, and a stator coil mounted on the stator core so that a load side coil end and an opposite load side coil end project from a load side end surface and an opposite load side end surface of the stator core, respectively;
a load side bracket attached to the load side end surface of the frame, the load side bracket having a groove formed on the bracket for inserting the load side coil end therein, the groove having a ceramic coating formed on an inner surface of the groove, wherein one or more surfaces including at least an end surface among an inner circumferential surface and the end surface of the load side coil end adhere closely to the inner surface of the groove through the ceramic coating without a gap therebetween;
an opposite load side bracket attached to the opposite load side end surface of the frame;
a rotating shaft rotatably supported by the load side bracket and the opposite load side bracket through a load side bearing and an opposite load side bearing, respectively; and
a rotor attached to an outer circumferential surface of the rotating shaft.

\* \* \* \* \*